(12) United States Patent
Getsiv

(10) Patent No.: US 11,306,754 B2
(45) Date of Patent: *Apr. 19, 2022

(54) RESILIENT MOUNTING CLIPS, PANEL MOUNT SYSTEMS INCLUDING THE SAME, AND ASSOCIATED METHODS

(71) Applicant: Nova USA Wood Products, LLC, Forest Grove, OR (US)

(72) Inventor: Stephen Getsiv, Portland, OR (US)

(73) Assignee: Nova USA Wood Products, LLC, Forest Grove, OR (US)

(*) Notice: Subject to any disclaimer, the term of this patent is extended or adjusted under 35 U.S.C. 154(b) by 0 days.

This patent is subject to a terminal disclaimer.

(21) Appl. No.: 17/016,950

(22) Filed: Sep. 10, 2020

(65) Prior Publication Data
US 2020/0408230 A1 Dec. 31, 2020

Related U.S. Application Data

(63) Continuation of application No. 16/235,318, filed on Dec. 28, 2018, now Pat. No. 10,801,537.
(Continued)

(51) Int. Cl.
| F16B 5/06 | (2006.01) |
| E04F 15/02 | (2006.01) |
| F16B 2/22 | (2006.01) |

(52) U.S. Cl.
CPC ...... *F16B 5/0607* (2013.01); *E04F 15/02044* (2013.01); *E04F 2015/02094* (2013.01); *F16B 2/22* (2013.01)

(58) Field of Classification Search
CPC .................. E04F 15/02044; E04F 2015/02094
See application file for complete search history.

(56) References Cited

U.S. PATENT DOCUMENTS

| 876,399 A | 1/1908 | Robinson |
| 1,246,585 A | 11/1917 | Geraerdts |
(Continued)

FOREIGN PATENT DOCUMENTS

| CA | 398194 | 7/1941 |
| CA | 965569 | 4/1975 |
(Continued)

OTHER PUBLICATIONS

Website screenshots showing installation instructions, downloaded from strongtie.com, Mar. 5, 2020.
(Continued)

*Primary Examiner* — Rodney Mintz
(74) *Attorney, Agent, or Firm* — Dascenzo Gates Intellectual Property Law, P.C.

(57) ABSTRACT

Resilient mounting clips, panel mount systems including the same, and associated methods. A resilient mounting clip includes a support structure engagement portion and a panel engagement portion with a plurality of edge extensions and a plurality of outboard panel supports. Each outboard panel support extends from a respective edge extension. Each outboard panel support is configured to move at least substantially parallel to a compression axis when the respective edge extension resiliently flexes with respect to the support structure engagement portion. A panel mount system includes at least one support structure, at least one resilient mounting clip, and at least two panels received by each mounting clip. A method of assembling a panel mount system includes positioning and securing a resilient mounting clip on a support structure and receiving each of a first panel and a second panel with the resilient mounting clip.

29 Claims, 15 Drawing Sheets

Related U.S. Application Data

(60) Provisional application No. 62/633,979, filed on Feb. 22, 2018, provisional application No. 62/614,179, filed on Jan. 5, 2018.

(56) References Cited

U.S. PATENT DOCUMENTS

| | | |
|---|---|---|
| 1,661,251 A | 3/1928 | Frey |
| 1,714,738 A | 5/1929 | Smith |
| 1,879,457 A | 9/1932 | Paulsen |
| 1,888,611 A | 11/1932 | Wolfson |
| 1,889,138 A | 11/1932 | Wolfson |
| 1,898,364 A | 2/1933 | Gynn |
| 1,905,616 A | 4/1933 | Zanella |
| 1,974,819 A | 9/1934 | Koerner |
| 2,038,433 A | 4/1936 | Lawrence, Jr. |
| 2,116,737 A | 5/1938 | Urbain |
| 2,129,976 A | 9/1938 | Urbain et al. |
| 2,258,574 A | 10/1941 | Leary |
| 2,303,103 A | 11/1942 | Adams |
| 2,641,809 A | 6/1953 | Kimball |
| 2,807,063 A | 9/1957 | Berow |
| 2,880,481 A | 4/1959 | Robinson, Jr. |
| 3,144,733 A | 8/1964 | Balinski |
| 3,171,232 A | 3/1965 | Gretter |
| 3,174,256 A | 3/1965 | Lockwood |
| 3,181,662 A | 5/1965 | Maertzig, Jr. |
| 3,261,136 A | 7/1966 | Abner et al. |
| 3,331,180 A | 7/1967 | Vissing et al. |
| 3,398,982 A | 8/1968 | Venzie, Jr. |
| 3,412,515 A | 11/1968 | Finon |
| 3,553,919 A | 1/1971 | Omholt |
| 3,568,391 A | 3/1971 | Conway |
| 3,577,694 A | 5/1971 | Omholt |
| 3,786,608 A | 1/1974 | Boettcher |
| 4,117,644 A | 10/1978 | Weinar |
| 4,170,859 A | 10/1979 | Counihan |
| 4,296,580 A | 10/1981 | Weinar |
| 4,333,286 A | 6/1982 | Weinar |
| 4,395,858 A | 8/1983 | Gwyther |
| 4,471,593 A | 9/1984 | Ragland |
| 4,516,373 A | 5/1985 | Osawa |
| 4,599,842 A | 7/1986 | Counihan |
| 4,616,462 A | 10/1986 | Abendroth |
| 4,620,403 A | 11/1986 | Field |
| 4,621,473 A | 11/1986 | Wendt |
| 4,635,424 A | 1/1987 | Drapeau |
| 4,703,603 A | 11/1987 | Hills |
| 4,777,778 A | 10/1988 | Taupin |
| 5,245,811 A | 9/1993 | Knorr |
| 5,274,977 A | 1/1994 | Bayly |
| 5,361,554 A | 11/1994 | Bryan |
| 5,502,942 A | 4/1996 | Gras et al. |
| 5,653,079 A | 8/1997 | Loeffler et al. |
| 5,775,048 A | 7/1998 | Orchard |
| 5,987,835 A | 11/1999 | Santarossa |
| 6,279,286 B1 | 8/2001 | Ichihashi |
| 6,314,699 B1 | 11/2001 | West |
| 6,315,489 B1 | 11/2001 | Watanabe |
| 6,402,415 B1 | 6/2002 | Eberle, III |
| 6,402,419 B1 | 6/2002 | Watanabe |
| 6,416,269 B1 | 7/2002 | Martel et al. |
| 6,418,693 B2 | 7/2002 | Ballard |
| 6,490,838 B2 | 12/2002 | Summerford |
| 6,497,395 B1 | 12/2002 | Croker |
| 6,540,432 B2 | 4/2003 | Albanese |
| 6,615,559 B2 | 9/2003 | McGrath et al. |
| 6,651,398 B2 | 11/2003 | Gregori |
| 6,711,864 B2 | 3/2004 | Erwin |
| 6,755,003 B1 | 6/2004 | McGrath et al. |
| 6,810,633 B2 | 11/2004 | Harris, Sr. |
| 6,851,884 B2 | 2/2005 | Eberle |
| 6,871,467 B2 | 3/2005 | Hafner |
| 7,052,200 B2 | 5/2006 | Harris |
| 7,338,050 B1 | 3/2008 | Tellez |
| 7,386,959 B2 | 6/2008 | Ouellette |
| 7,398,623 B2 | 7/2008 | Martel et al. |
| 7,409,803 B2 | 8/2008 | Grohman |
| 7,546,717 B2 | 6/2009 | Juan Puerta |
| 7,578,105 B2 | 8/2009 | Eberle, III |
| 7,596,911 B2 | 10/2009 | Turco |
| 7,600,353 B2 | 10/2009 | Hafner |
| 7,614,197 B2 | 11/2009 | Nelson |
| 7,634,883 B1 | 12/2009 | Larson et al. |
| 7,748,188 B2 | 7/2010 | Ito |
| 7,757,450 B2 | 7/2010 | Reyes et al. |
| 7,805,902 B2 | 10/2010 | Martel |
| 7,874,113 B2 | 1/2011 | Eberle, III |
| 7,908,812 B2 | 3/2011 | Eberle, III |
| 7,984,599 B2 | 7/2011 | Snell et al. |
| 8,011,153 B2 | 9/2011 | Orchard |
| 8,161,702 B2 | 4/2012 | Eberle, III |
| D663,612 S | 7/2012 | Pelc |
| 8,225,571 B2 | 7/2012 | Orchard |
| 8,534,526 B2 | 9/2013 | Orchard |
| 8,584,416 B2 | 11/2013 | Chenier et al. |
| 8,910,442 B2 | 12/2014 | Lachevrotiere et al. |
| 9,085,907 B2 | 7/2015 | Rutherford |
| 9,181,715 B2 | 10/2015 | Orchard |
| 9,181,716 B1 | 11/2015 | Gibson |
| 10,370,846 B1 | 8/2019 | Neuwirt |
| 10,801,537 B2 * | 10/2020 | Getsiv .............. F16B 7/0473 |
| 2003/0019174 A1 | 1/2003 | Bolduc |
| 2003/0121226 A1 | 7/2003 | Bolduc |
| 2005/0278934 A1 | 12/2005 | Orchard |
| 2007/0062137 A1 | 3/2007 | Maylon |
| 2009/0249721 A1 | 10/2009 | Cullen |
| 2010/0101178 A1 | 4/2010 | Reif |
| 2010/0205895 A1 * | 8/2010 | Orchard .............. E04F 15/02 52/712 |
| 2014/0099161 A1 * | 4/2014 | Chen .............. F16B 5/0635 403/326 |
| 2014/0165491 A1 * | 6/2014 | Lachevrotiere ....... E04F 15/105 52/489.1 |
| 2015/0059272 A1 | 3/2015 | Husler |
| 2015/0191910 A1 | 7/2015 | Bordener |
| 2017/0021479 A1 | 1/2017 | Orchard et al. |
| 2017/0106513 A1 | 4/2017 | Orchard |
| 2017/0114554 A1 | 4/2017 | LeVey |
| 2019/0211856 A1 * | 7/2019 | Getsiv .............. E04F 15/02044 |

FOREIGN PATENT DOCUMENTS

| | | |
|---|---|---|
| CA | 1027729 | 3/1978 |
| CA | 1167619 | 5/1984 |
| CA | 1290131 | 10/1991 |
| CA | 1298455 | 4/1992 |
| DE | 202008001033 | 4/2008 |
| DE | 102008012144 | 9/2009 |
| DK | 89888 | 10/1960 |
| EP | 2366848 | 9/2011 |
| GB | 571590 | 8/1945 |
| GB | 697546 | 9/1953 |
| GB | 2371609 | 7/2002 |
| GB | 2387210 | 10/2003 |
| JP | H 102089 | 1/1998 |
| JP | H 10148024 | 6/1998 |
| KR | 101572981 | 11/2015 |
| NL | 1013914 | 10/2000 |
| WO | WO 2006/066727 | 6/2006 |
| WO | WO 2017/130107 | 8/2017 |

OTHER PUBLICATIONS

Website screenshots showing "Invisi-Fast Hidden Deck Fastener", downloaded Feb. 25, 2020 from https://web.archive.org/web/20070829213914/http://www.invisifast.com/.

Website screenshots showing Lumber Loc installation instructions, downloaded Feb. 25, 2020 from https://web.archive.org/web/20100923032454/http://www.lumberloc.com/extinst.htm.

Website screenshots showing "Ipe Clip Hidden Fasteners", downloaded Feb. 25, 2020 from https://web.archive.org/web/

(56) References Cited

OTHER PUBLICATIONS

20060718013455/http://www.ipeclip.com/.
Machine generated English translation of DK 89888 downloaded from Google translate on Feb. 25, 2020.
Machine generated English translation of JPH 102089 downloaded from Espacenet.com on Mar. 5, 2020.
Machine generated English translation of JPH10148024 downloaded from Espacenet.com on Mar. 5, 2020.
Machine generated English translation of NL 1013914 downloaded from Espacenet.com on Mar. 9, 2020.
Machine generated English translation of WO 2006/066727 downloaded from Espacenet.com on Mar. 5, 2020.
Machine generated English translation of DE 202008001033 downloaded from Google translate on Mar. 5, 2020.
Machine generated English translation of DE 102008012144 downloaded from Google translate on Mar. 9, 2020.
Machine generated English abstract of KR 101572981, provided by the USPTO on Dec. 5, 2019.

* cited by examiner

RESILIENT MOUNTING CLIPS, PANEL MOUNT SYSTEMS INCLUDING THE SAME, AND ASSOCIATED METHODS

RELATED APPLICATIONS

The present application is a continuation of, and claims priority to, U.S. application Ser. No. 16/235,318, which was filed on Dec. 28, 2018, and which claims priority to U.S. Provisional Patent Application Ser. No. 62/633,979, which was filed on Feb. 22, 2018, and to U.S. Provisional Patent Application Ser. No. 62/614,179, which was filed on Jan. 5, 2018, the complete disclosures of which are hereby incorporated by reference.

FIELD

The present disclosure relates to resilient mounting clips, panel mount systems including the same, and associated methods.

BACKGROUND

Structural surfaces such as rain screens, curtain walls, and decks may be assembled from a plurality of panels that are fastened to a support structure to collectively form the structural surface. In certain applications, it may be desirable to position the panels in close and/or overlapping proximity to one another, such as to provide a barrier against wind and/or rain. Such panels often are constructed of a material, such as wood, that may expand and/or contract due to changes in temperature or moisture content. This expansion and/or contraction may cause the panels to shift relative to the fasteners coupling the panels to the support structure and/or to exert forces on one another that may reduce the integrity of the structural surface.

SUMMARY

Resilient mounting clips, panel mount systems including the same, and associated methods are disclosed herein. A resilient mounting clip for mounting a pair of panels relative to a support structure includes a support structure engagement portion configured to be selectively installed on the support structure and a panel engagement portion operatively coupled to the support structure engagement portion. The panel engagement portion is configured to receive each panel of the pair of panels. The panel engagement portion includes a plurality of edge extensions and a plurality of outboard panel supports. Each outboard panel support extends from a respective edge extension and is configured to at least partially retain a respective panel of the pair of panels in position with respect to the support structure. Each outboard panel support extends at least substantially parallel to a panel plane. The panel engagement portion additionally includes a plurality of panel contact locations, each panel contact location configured to engage at least a portion of a respective longitudinal edge of the respective panel of the pair of panels. Each panel contact location is defined by at least one of an edge extension of the plurality of edge extensions and an outboard panel support of the plurality of outboard panel supports. Each edge extension is configured to resiliently flex with respect to at least a portion of the support structure engagement portion responsive to the respective longitudinal edges of the pair of panels moving toward and away from one another. Each outboard panel support is configured to move along a direction that is at least substantially parallel to a compression axis of the resilient mounting clip when the respective edge extension resiliently flexes with respect to the support structure engagement portion.

A panel mount system for mounting a plurality of panels to form a structural surface includes at least one support structure, at least one resilient mounting clip operatively coupled to the support structure, and at least two panels received by each mounting clip. A method of assembling a panel mount system includes positioning a resilient mounting clip along a support structure, securing the resilient mounting clip to the support structure, receiving a first panel in a first panel engagement portion of the resilient mounting clip, and receiving a second panel in a second panel engagement portion of the resilient mounting clip.

DETAILED DESCRIPTION

FIGS. 1-27 provide examples of resilient mounting clips 100, of panel mount systems 10 including the resilient mounting clips, and/or of methods 200 of assembling the panel mount systems, according to the present disclosure. Elements that serve a similar, or at least substantially similar, purpose are labeled with like numbers in each of FIGS. 1-27, and these elements may not be discussed in detail herein with reference to each of FIGS. 1-27. Similarly, all elements may not be labeled in each of FIGS. 1-27, but reference numbers associated therewith may be utilized herein for consistency. Elements, components, and/or features that are discussed herein with reference to one or more of FIGS. 1-27 may be included in and/or utilized with any of FIGS. 1-27 without departing form the scope of the present disclosure.

In general, elements that are likely to be included in a given (i.e., a particular) embodiment are illustrated in solid lines, while elements that are optional to a given embodiment are illustrated in dashed lines. However, elements that are shown in solid lines are not essential to all embodiments, and an element shown in solid lines may be omitted from a given embodiment without departing from the scope of the present disclosure.

Figure 1:
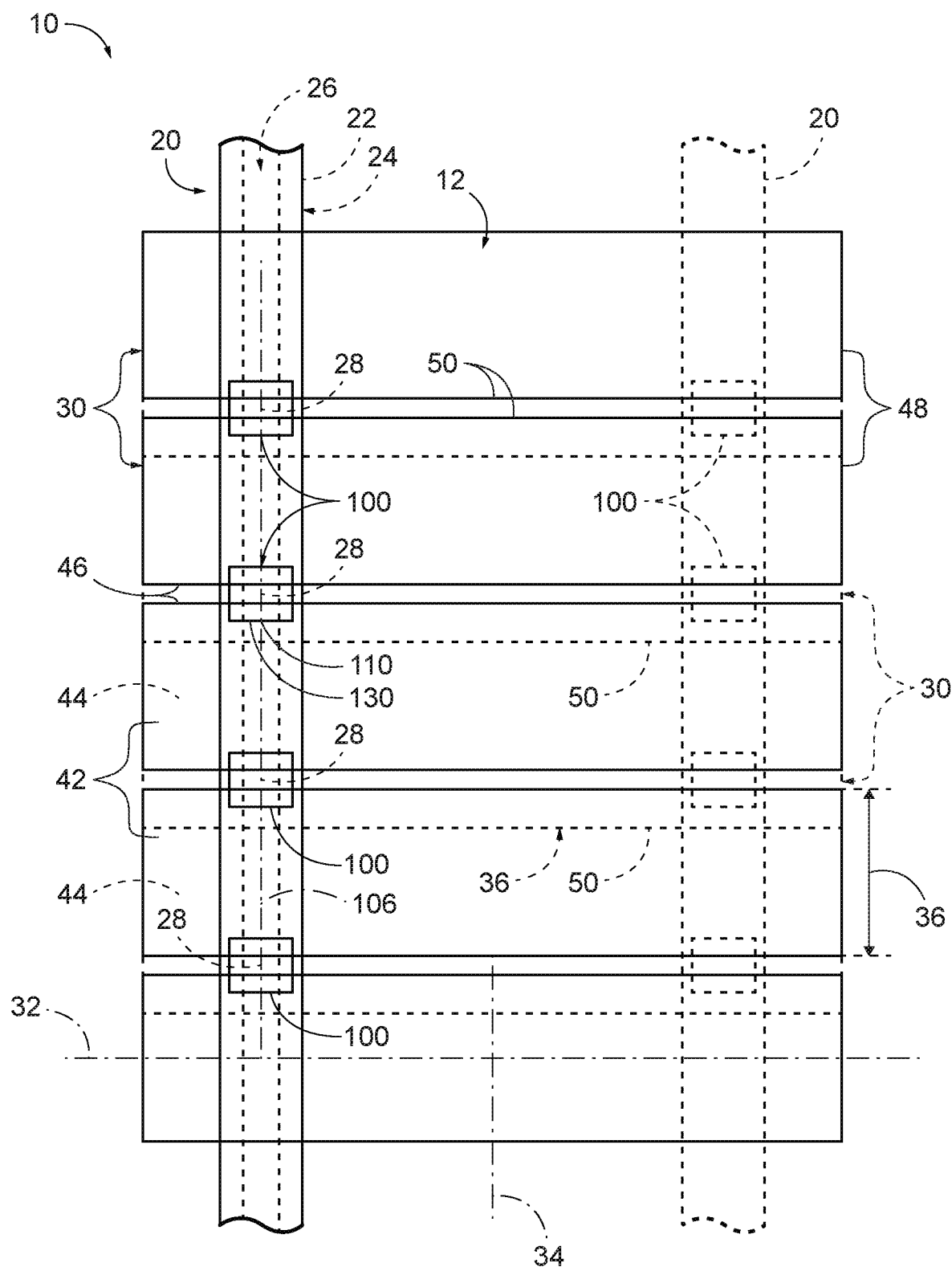
FIG. 1 is a schematic elevation or plan view illustrating examples of panel mount systems according to the present disclosure.

FIG. 1 is a schematic illustration of a panel mount system 10 that includes a plurality of panels 30 that collectively form a structural surface 12. As schematically illustrated in FIG. 1, panel mount system 10 includes at least one support structure 20 and at least one resilient mounting clip 100 operatively coupled to the support structure to mount each panel 30 to the support structure. Specifically, each resilient mounting clip 100 receives at least two panels 30 and at least partially supports the panels relative to support structure 20 to operatively couple the panels to the support structure. As additionally schematically illustrated in FIG. 1, each panel 30 of a pair of adjacent panels 30 may be operatively received by each of a plurality of resilient mounting clips 100 positioned between the adjacent panels, such as two resilient mounting clips, three resilient mounting clips, four resilient mounting clips, or more than four resilient mounting clips. As further schematically illustrated in FIG. 1, resilient mounting clip 100 may be operatively coupled to support structure 20 via a fastener 28.

Each panel 30 may be described as having a panel exterior face 42 that forms a portion of and/or partially defines structural surface 12 and a panel interior face 44 opposite, or at least generally opposed to, the panel exterior face. Panel exterior face 42 also may be described as facing away from support structure 20 when panel 30 is operatively received by resilient mounting clip 100 and when the resilient mounting clip is operatively coupled to support structure 20. Similarly, panel interior face 44 may be described as facing toward support structure 20 when panel 30 is operatively received by resilient mounting clip 100 and when the resilient mounting clip is operatively coupled to support structure 20. Each panel 30 additionally may be described as having and/or as extending along a panel plane 108 such that panel exterior face 42 and/or panel interior face 44 is at least substantially parallel to the panel plane. Structural surface 12 may include and/or be any appropriate surface formed from a plurality of panels, such as a rain screen, a curtain wall, a façade, an exterior siding, and/or a deck. Additionally or alternatively, each support structure 20 may extend along a direction that is at least substantially vertical (such as in an embodiment in which structural surface 12 is a rain screen) or may extend along a direction that is at least substantially horizontal (such as in an embodiment in which structural surface 12 is a deck). However, this is not required to all examples of panel mount system 10, and it additionally is within the scope of the present disclosure that each support structure 20 may extend along any appropriate direction, such as a direction that is oblique to a ground surface.

As used herein, directional terms such as "horizontal," "vertical," and the like may be used to describe spatial relationships between components of panel mount system 10 in an illustrative, non-limiting manner, and generally refer to directions relative to a level ground surface. As examples, a horizontal direction may refer to a direction that is at least substantially parallel to the level ground surface, and/or a vertical direction may refer to a direction that is at least substantially perpendicular to the level ground surface. Such terms are provided as context only and do not limit component parts of panel mount system 10 to always be in a specific orientation relative to the level ground surface.

As used herein, the terms "receive" and "received," as used to describe a positional relationship between a first component and a second component, generally refer to a configuration in which at least a portion of the first component at least partially, and optionally substantially, surrounds and/or extends around at least a portion of the second component and/or in which at least a portion of the second component extends into or within a recess or other open space defined or bounded by the first component. That is, in such a configuration, the first component may be described as receiving the second component, and/or the second component may be described as being received by the first component. Additionally or alternatively, a first component may be described as receiving a second component when the first component includes two spaced-apart points such that a straight line connecting the two spaced-apart points intersects the second component.

Each panel 30 may have any appropriate shape and may be positioned relative to support structure 20 in any appropriate manner. For example, each panel 30 may be at least substantially rectangular and/or may have a pair of longitudinal edges 46 and a pair of lateral edges 48 such that each longitudinal edge is longer than each lateral edge. As schematically illustrated in FIG. 1, each longitudinal edge 46 may extend in a direction that is parallel to a longitudinal axis 32 of panel 30, and each lateral edge 48 may extend in a direction that is parallel to a lateral axis 34 of the panel 30. Lateral axis 34 may be perpendicular to each longitudinal edge 46 and/or to longitudinal axis 32. In general, longitudinal axis 32 and lateral axis 34 each extend along a direction that is at least substantially parallel to panel plane 108.

As used herein, the term "edge," as used to describe a portion and/or feature of panel 30, may refer to any appropriate portion, region, surface, and/or intersection thereof of the panel. For example, longitudinal edge 46 of panel 30 may refer to any surface and/or region of the panel that at least partially defines and/or includes an extremity of a long side of the panel. Similarly, lateral edge 48 of panel 30 may refer to any surface and/or region of the panel that at least partially defines and/or includes an extremity of a short side of the panel. Accordingly, a longitudinal edge 46 and/or a lateral edge 48 may include and/or be a surface, a generally planar surface, a curved surface, a line (such as may be defined by the intersection of two non-parallel planar surfaces), and/or any appropriate combination thereof.

Each panel 30 may be positioned such that support structure 20 extends at least substantially perpendicular to the longitudinal axis 32 of each panel. Additionally or alternatively, each panel 30 may be positioned such that longitudinal axis 32 of each panel is at least substantially parallel to a ground surface when the panel is operatively received by resilient mounting clip 100. Stated differently, each panel 30 may be positioned such that longitudinal axis 32 of each panel extends along a direction that is at least substantially horizontal when the panel is operatively received by resilient mounting clip 100 and when the resilient mounting clip is operatively coupled to support structure 20. However, this is not required to all examples of panel mount system 10, and it additionally is within the scope of the present disclosure that the longitudinal axis 32 of each panel 30 may be at least substantially transverse, and/or at least substantially perpendicular, to the ground surface when the panel is operatively received by resilient mounting clip 100. Stated differently, each panel 30 may be positioned such that longitudinal axis 32 of each panel extends along a direction that is at least substantially vertical when the panel is operatively received by resilient mounting clip 100 and when the resilient mounting clip is operatively coupled to support structure 20.

Each panel 30 additionally or alternatively may be positioned such that lateral axis 34 has any appropriate orientation with respect to a ground surface. For example, each panel 30 may be positioned such that lateral axis 34 of each panel is at least substantially parallel to a ground surface when the panel is operatively received by resilient mounting clip 100 and when the resilient mounting clip is operatively coupled to support structure 20. Stated differently, each panel 30 may be positioned such that lateral axis 34 of each panel extends along a direction that is at least substantially horizontal when the panel is operatively received by resilient mounting clip 100. However, this is not required to all examples of panel mount system 10, and it additionally is within the scope of the present disclosure that the lateral axis 34 of each panel 30 may be at least substantially transverse, and/or at least substantially perpendicular, to the ground surface when the panel is operatively received by resilient mounting clip 100 and when the resilient mounting clip is operatively coupled to support structure 20. Stated differently, each panel 30 may be positioned such that lateral axis 34 of each panel extends along a direction that is at least substantially vertical when the panel is operatively received by resilient mounting clip 100.

It additionally is within the scope of the present disclosure that each panel 30 may be positioned such that longitudinal axis 32 and/or lateral axis 34 is neither parallel to nor perpendicular to the ground surface. For example, panel mount system 10 may be configured such that longitudinal axis 32 and/or lateral axis 34 of each panel 30 is at least substantially oblique to the ground surface when the panel is operatively received by resilient mounting clip 100 and when the resilient mounting clip is operatively coupled to support structure 20.

Each panel 30 may be formed of any appropriate material, such as wood. As more specific examples, each panel may be formed of ipe, mahogany, batu mahogany, cumaru, cedar, redwood, and/or pine. Additionally or alternatively, each panel may be formed of a wood such that a wood grain of the panel is at least substantially parallel to longitudinal axis 32 of the panel. Additionally or alternatively, each panel may be formed at least partially of a wood product that lacks a well-defined wood grain direction, such as a fiberboard. It additionally is within the scope of the present disclosure that one or more, or even all, panels 30 may be formed in whole or in part from different materials, including materials that are not wood. Examples of such materials may include metals, composites materials, and/or synthetic materials.

Each panel 30 additionally may include any appropriate surface, edging, and/or joint structure. As examples, each panel may be characterized as an S4S panel that has four surfaced sides. Additionally or alternatively, each panel may be characterized as an E4E panel that has four eased edges. Additionally or alternatively, each longitudinal edge 46 of the panel may include a joint structure 50 configured to engage at least one respective resilient mounting clip 100. As examples, the joint structure may include and/or be a lap joint, a ship lap joint, a drop lap joint, a tongue and groove joint, a Dutch lap joint, a shadow lap joint, and/or a rabbet joint. As schematically illustrated in solid lines in FIG. 1, panel mount system 10 may be configured such that the longitudinal edges 46 of adjacent panels 30 are spaced-apart. Alternatively, and as schematically illustrated in dashed lines in FIG. 1, panel mount system 10 and/or joint structure 50 thereof may be configured such that adjacent panels 30 (and/or the joint structures thereof) are at least partially overlapping, such as to at least partially conceal resilient mounting clip 100 from view.

Support structure 20 may include and/or be any appropriate structure for supporting resilient mounting clip 100. For example, and as schematically illustrated in FIG. 1, support structure 20 may include and/or be a joist 22, and resilient mounting clip 100 may be operatively coupled to the joist by fastener 28. As more specific examples, each support structure 20 may include and/or be a floor joist, a ceiling joist, a wall joist, a binding joist, and/or a bridging joist. Additionally or alternatively, support structure 20 may include and/or be an installation rail 24 that includes a channel 26 extending along the installation rail. In such an embodiment, resilient mounting clip 100 may be at least partially received within channel 26 to operatively couple the resilient mounting clip to the installation rail. Additionally or alternatively, in such an embodiment, resilient mounting clip 100 may be operatively coupled to installation rail 24 by fastener 28.

Each resilient mounting clip 100 generally is configured to resiliently and repeatedly accommodate expansion and/or contraction of the panels 30 that are received by the resilient mounting clip, as described herein. Each panel 30 may be formed of a material, such as a wood, that expands and/or contracts responsive to a change in an environmental condition such that the panel expands and/or contracts along a direction that is at least substantially perpendicular to longitudinal axis 32. Examples of such environmental conditions include an ambient humidity, an ambient moisture level, and/or an ambient temperature. Accordingly, resilient mounting clip 100 is configured such that, when panel mount system 10 is assembled such that each resilient mounting clip receives the respective longitudinal edges 46 of adjacent panels 30, each resilient mounting clip resiliently flexes responsive to the longitudinal edges of the pair of panels moving toward and away from one another. More specifically, and with reference to FIG. 1, each resilient mounting clip 100 resiliently flexes responsive to the longitudinal edges of the pair of panels moving toward and away from one another along a compression axis 106 of the resilient mounting clip. As schematically illustrated in FIG. 1, lateral axis 34 of each panel 30 may be at least substantially parallel to compression axis 106 of resilient mounting clip 100 when the panel is operatively received by the resilient mounting clip and when the resilient mounting clip is operatively coupled to support structure 20.

Figure 2:
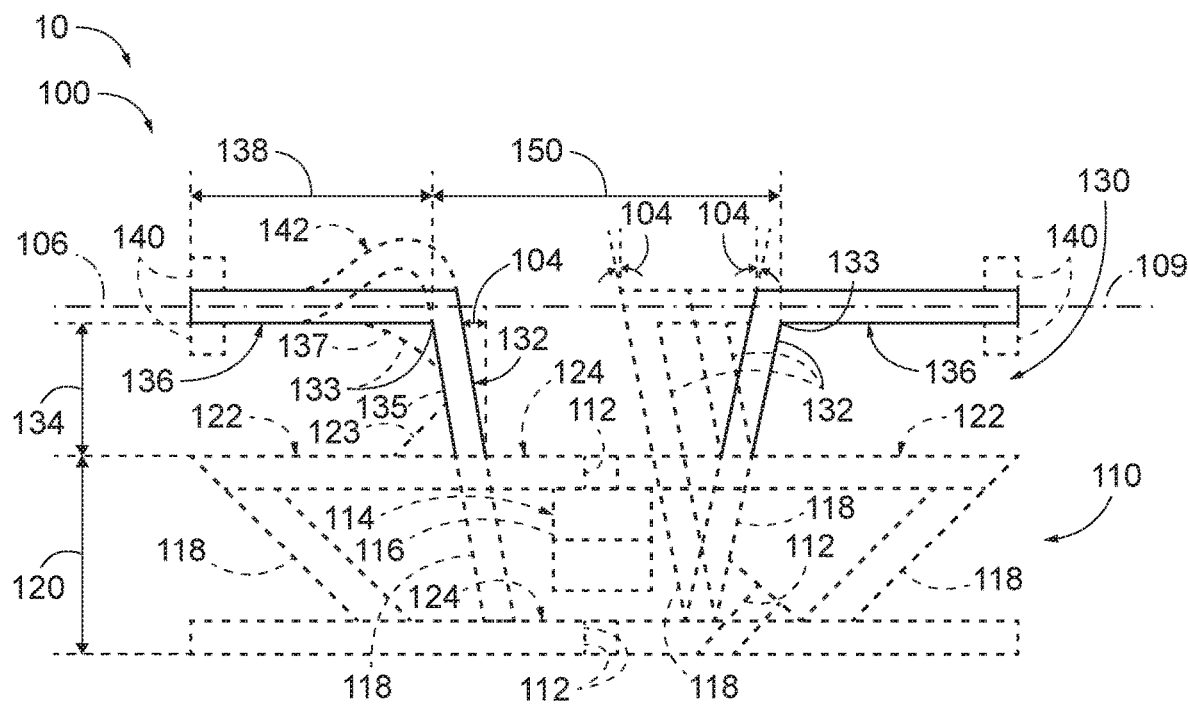
FIG. 2 is a schematic end elevation view illustrating examples of resilient mounting clips according to the present disclosure.
Figure 3:
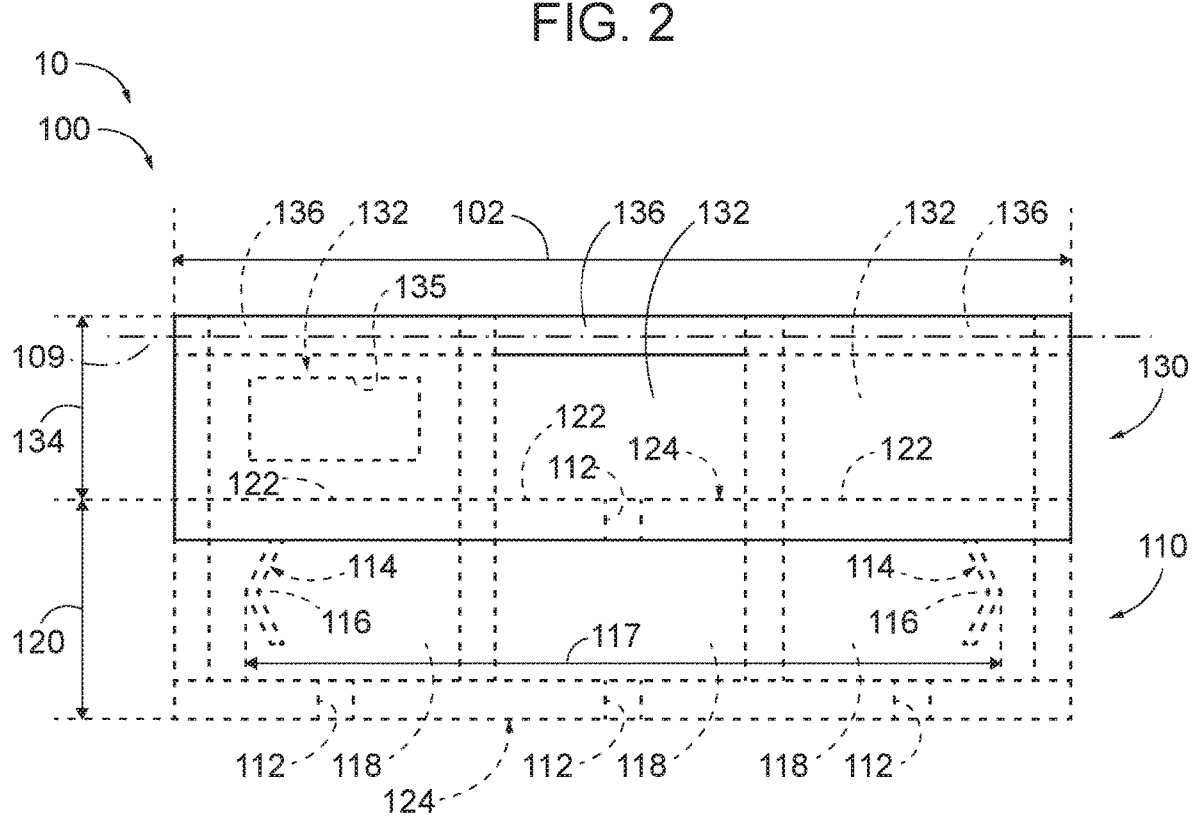
FIG. 3 is a schematic side elevation view illustrating examples of resilient mounting clips according to the present disclosure.

FIGS. 2-3 schematically illustrate examples of resilient mounting clips 100 according to the present disclosure. As illustrated in FIGS. 2-3, resilient mounting clip 100 includes a support structure engagement portion 110 configured to be selectively installed on support structure 20 and a panel engagement portion 130 operatively coupled to the support structure engagement portion and configured to receive each panel 30. Panel engagement portion 130 includes a plurality of edge extensions 132 and a plurality of outboard panel supports 136 such that each outboard panel support 136 extends from a respective edge extension 132. For example, and as schematically illustrated in FIGS. 2-3, resilient mounting clip 100 may define a clip plane 109 that is at least substantially parallel to panel plane 108 and/or a plane defined by the region of the support structure when each panel 30 is operatively received by the mounting clip and when the resilient mounting clip is operatively coupled to support structure 20. The plane defined by the region of the support structure to which the mounting clip is operatively coupled may be referred to as a support structure plane. In such an example, compression axis 106 may be described as extending at least substantially parallel to clip plane 109, and/or each outboard panel support 136 may be described as extending from the respective edge extension 132 at least substantially parallel to clip plane 109. Similarly, each outboard panel support 136 may be described as extending from the respective edge extension 132 at least substantially parallel to compression axis 106. As used herein, a component (such as outboard panel support 136) may be described as extending at least substantially parallel to a given plane (such as clip plane 109) or axis (such as compression axis 106) even when the component does not assume a substantially planar, linear, and/or flat configuration. As an example, outboard panel support 136 may be described as extending at least substantially parallel to clip plane 109 even when the outboard panel support itself assumes an arcuate configuration and/or does not substantially occupy a plane that is parallel to the clip plane. Additionally or alternatively, a component may be described as extending at least substantially parallel to a given plane when two spaced-apart points on the component may be connected by a straight line that extends at least substantially parallel to the given plane. Similarly, a component may be described as extending at least substantially parallel to a given axis when two spaced-apart points on the component may be connected by a straight line that extends at least substantially parallel to the given axis.

Each outboard panel support 136 is configured to at least partially retain the respective panel 30 in position with respect to support structure 20. Stated differently, when panel 30 is operatively received by panel engagement portion 130 to support the panel relative to support structure 20, outboard panel support 136 may engage the panel to restrict the panel from moving away from the support structure. As schematically illustrated in FIG. 2, panel engagement portion 130 additionally includes a plurality of panel contact locations 133, each configured to engage at least a portion of a respective longitudinal edge 46 of a respective panel 30 that is received by the panel engagement portion. Stated differently, each panel contact location 133 may be configured to contact a surface of a respective panel 30 that is adjacent to and/or included within longitudinal edge 46 of the respective panel. Each panel contact location 133 may be defined by edge extension 132 and/or by the respective outboard panel support 136. For example, and as schematically illustrated in FIG. 2, panel contact location 133 may be located at or near an intersection of edge extension 132 and the respective outboard panel support 136. However, this is not required to all examples of resilient mounting clip 100, and it additionally is within the scope of the present disclosure that panel contact location 133 may be at least partially spaced-apart from edge extension 132, the respective outboard panel support 136, and/or an intersection thereof.

Each edge extension 132 is configured to resiliently flex with respect to at least a portion of support structure engagement portion 110 responsive to the respective longitudinal edges 46 of a pair of panels 30 moving toward and away from one another. More specifically, each outboard panel support 136 is configured to move along a direction that is at least substantially parallel to compression axis 106 of resilient mounting clip 100 (schematically illustrated in FIG. 2) when the respective edge extension 132 resiliently flexes with respect to support structure engagement portion 110. Stated differently, resilient mounting clip 100 is configured such that each edge extension 132 flexes to move the outboard panel support 136 extending from the edge extension at least substantially along compression axis 106 when each panel 30 received by the resilient mounting clip expands, contracts, and/or otherwise translates along the compression axis 106. In this manner, resilient mounting clip 100 may secure each panel 30 to support structure 20 while accommodating the expansion and contraction of each panel, such as due to changes in temperature and/or moisture. More specifically, the plurality of edge extensions 132 may be characterized by a nominal position with respect to the base, such as when panels 30 are not received by panel engagement portion 130, and/or when the plurality of edge extensions 132 have not been flexed toward and/or away from one another via engagement with the panels. The plurality of edge extensions 132 further may be characterized by at least one flexed position with respect to the base when the plurality of edge extensions 132 have been flexed away from the nominal position. Stated differently, each edge extension 132 is configured to resiliently flex to transition between the nominal position and the flexed position. Resilient mounting clip 100 may be configured to resiliently bias each edge extension 132 toward the nominal position when the edge extension is in the flexed position. Resilient mounting clip 100 may include any appropriate number of edge extensions 132, such as two edge extensions, three edge extensions, four edge extensions, or more than four edge extensions.

Resilient mounting clip 100 may have any appropriate overall dimensions and/or construction, such as to facilitate the resilient flexing of the plurality of edge extensions 132 while securely maintaining each panel 30 mounted on support structure 20. For example, and as schematically illustrated in FIG. 3, the elastic modulus of resilient mounting clip 100 may be related to a clip length 102 of the resilient mounting clip, as measured in a direction parallel to clip plane 109 and perpendicular to compression axis 106. As more specific examples, clip length 102 may be at least 10 millimeters (mm) (0.39 inches (in)), at least 20 mm (0.79 in), at least 30 mm (1.18 in), at least 40 mm (1.57 in), at least 50 mm (1.97 in), at least 60 mm (2.36 in), at least 70 mm (2.76 in), at least 80 mm (3.15 in), at least 90 mm (3.54 in), at least 100 mm (3.94 in), at least 150 mm (5.91 in), at most 200 mm (7.87 in), at most 175 mm (6.89 in), at most 125 mm (4.92 in), at most 95 mm (3.74 in), at most 85 mm (3.35 in), at most 75 mm (2.95 in), at most 65 mm (2.56 in), at most 55 mm (2.17 in), at most 45 mm (1.77 in), at most 35 mm (1.38 in), at most 25 mm (0.98 in), and/or at most 15 mm (0.59 in).

Resilient mounting clip 100 may have any appropriate structure and/or material characteristics, such as to facilitate the flexing of each edge extension 132. As an example, the flexing of the plurality of edge extensions 132 away from the nominal position may be characterized by an elastic modulus of resilient mounting clip 100. Stated differently, each edge extension 132 may be configured to flex with respect to at least a portion of support structure engagement portion 110 with the elastic modulus of resilient mounting clip 100. For example, the elastic modulus may be sufficiently large that the panels 30 are held in a substantially fixed position relative to support structure 20, and/or may be sufficiently small that the force exerted on each edge extension 132 by the expansion and/or contraction of panel 30 flexes the edge extensions from the nominal position. As more specific examples, the elastic modulus may be at least 1 Megapascal (MPa) (145 pounds per square inch (psi)), at least 3 MPa (435 psi), at least 5 MPa (725 psi), at least 10 MPa (1450 psi), at least 30 MPa (4351 psi), at least 50 MPa (7251 psi), at least 100 MPa (14504 psi), at most 120 MPa (17404 psi), at most 70 MPa (10153 psi), at most 20 MPa (2901 psi), at most 7 MPa (1015 psi), and/or at most 2 MPa (290 psi).

Resilient mounting clip 100 may be constructed of any appropriate material, such as may be configured to enhance a rigidity and/or a flexibility of the resilient mounting clip, examples of which include one or more of a metal, an electroplated metal, steel, galvanized steel, spring steel, carbon steel, 1050 carbon steel, aluminum, extruded aluminum, a plastic, a thermoplastic, a polymer, an injection-molded polymer, a resin, an acetal, and combinations thereof. As additional examples, resilient mounting clip 100 may be formed from a sheet material with a thickness that is thicker than 16 gauge, 16 gauge, 18 gauge, 20 gauge, and/or thinner than 20 gauge.

Each edge extension 132 may have any appropriate size, structure, and/or orientation for engaging a respective panel 30 and/or for flexing with respect to support structure engagement portion 110. For example, and as schematically illustrated in FIGS. 2-3, each edge extension 132 may be characterized by an edge extension depth 134, as measured in a direction perpendicular to each outboard panel support 136. As more specific examples, edge extension depth 134 may be at least 3 mm (0.12 in), at least 10 mm (0.39 in), at least 20 mm (0.79 in), at least 30 mm (1.18 in), at least 40 mm (1.57 in), at least 50 mm (1.97 in), at least 60 mm (2.36 in), at least 70 mm (2.76 in), at most 75 mm (2.95 in), at most 65 mm (2.56 in), at most 55 mm (2.17 in), at most 45 mm (1.77 in), at most 35 mm (1.38 in), at most 25 mm (0.98 in), at most 15 mm (0.59 in), and/or at most 5 mm (0.20 in). Additionally or alternatively, edge extension depth 134 may be at least substantially equal to a thickness of a portion of a respective panel 30 that is received by panel engagement portion 130.

As further schematically illustrated in FIG. 2, each edge extension 132 additionally or alternatively may be characterized by a cant angle 104, as measured between the edge extension and a direction perpendicular to clip plane 109. In such an embodiment, each edge extension 132 may be angled generally toward or away from a respective panel 30 that is received by the respective panel engagement portion 130 by cant angle 104 when resilient mounting clip 100 is operably installed in panel mount system 10. Stated differently, and as schematically illustrated in solid lines in FIG. 2, edge extension 132 may be angled generally toward a direction in which a respective outboard panel support 136 extends from the edge extension by cant angle 104. As another example, and as schematically illustrated in dashed lines on the right-hand side of FIG. 2, edge extension 132 may be angled generally away from the direction in which the respective outboard panel support 136 extends from the edge extension by cant angle 104. Such a configuration may facilitate flexing of edge extension 132 responsive to a force exerted on the edge extension by panel 30, such as by receiving the force at a point distal a fulcrum of the flexing. That is, such a configuration may correspond to an increase in a torque imparted upon the edge extension relative to a configuration in which the edge extension contacts the panel along a substantially full extent of edge extension depth 134. As more specific examples, cant angle 104 may be 0 degrees, at least 0 degrees, at least 10 degrees, at least 20 degrees, at least 30 degrees, at least 40 degrees, at most 45 degrees, at most 35 degrees, at most 25 degrees, at most 15 degrees, and/or at most 5 degrees.

As further schematically illustrated in FIGS. 2-3, at least one edge extension 132 additionally or alternatively may include at least one edge extension cutout 135 defined by the edge extension. Specifically, each edge extension cutout 135 may include and/or be a recess, an indentation, a void, a hole, and/or an aperture defined by and/or within the edge extension. In this manner, each edge extension cutout may be configured to reduce and/or otherwise modify a mass, a material cost, and/or an elastic modulus of the corresponding edge extension 132 relative to an otherwise identical edge extension that lacks the edge extension cutout. As a more specific example, edge extension cutout 135 may be configured to reduce an elastic modulus of the corresponding edge extension 132 in a region adjacent to the edge extension cutout. In this manner, edge extension cutout 135 may serve to at least partially localize a flexure of the corresponding edge extension 132 to the region adjacent to the edge extension cutout when the corresponding edge extension is flexed away from the nominal position.

Each outboard panel support 136 may have any appropriate size and/or structure for engaging and/or retaining a respective panel 30. For example, and as schematically illustrated in FIGS. 2-3, each outboard panel support 136 may include at least one lip 140 extending toward and/or away from support structure engagement portion 110. In an embodiment in which lip 140 extends toward support structure engagement portion 110, lip 140 may be configured to positively engage a respective panel 30 to restrict the panel from moving with respect to panel engagement portion 130. In this manner, lip 140 may assist with retention of a received portion of panel 30, such as exterior joint face 54, in engagement with the resilient mounting clip 100, such as when expansion or contraction of the panel urges the panel to move relative to the clip. In some such embodiments, lip 140 may be configured to be at least partially recessed into panel 30, and/or received into a groove in the panel, when the panel is operatively received by panel engagement portion 130. Such a lip 140 additionally or alternatively may be referred to as a tooth 140, a rib 140, and/or a catch 140. In an embodiment in which lip 140 extends away from support structure engagement portion 110, such as at an inclined angle, the lip may assist with inserting a portion of panel 30, such as a portion of joint structure 50, between the outboard panel support and the support structure engagement portion. For example, such a lip 140 may serve to provide panel engagement portion 130 with an opening width (as measured in a direction perpendicular to clip plane 109) that is greater in the vicinity of the lip relative to a width at a location proximal the corresponding edge extension 132 relative to the lip. In this manner, lip 140 may serve to assist in guiding panel 30 into panel engagement portion 130.

As additionally schematically illustrated in FIG. 2, each outboard panel support 136 may be coupled to a corresponding edge extension 132 at an elbow projection 142. More specifically, and as illustrated in dashed lines in FIG. 2, each outboard panel support 136 may include elbow projection 142 that extends and/or curves away from support structure engagement portion 110 relative to the corresponding edge extension 132 that extends from the outboard panel support, and such that the corresponding edge extension extends from the elbow projection. In such an embodiment, elbow projection 142 may be configured to positively engage a respective panel 30, such as to restrict the panel from moving with respect to panel engagement portion 130. Additionally or alternatively, elbow projection 142 may be configured to facilitate flexing of edge extension 132 with respect to outboard panel support 136 responsive to a force exerted on the edge extension by panel 30.

As further schematically illustrated in FIG. 2, each outboard panel support 136 may be characterized by an outboard panel support length 138, as measured in a direction parallel to compression axis 106. Outboard panel support length 138 additionally or alternatively may be measured along a surface of outboard panel support 136 that is distal support structure engagement portion 110. As more specific examples, outboard panel support length 138 may be at least 3 mm (0.12 in), at least 10 mm (0.39 in), at least 20 mm (0.79 in), at least 30 mm (1.18 in), at least 40 mm (1.57 in), at least 50 mm (1.97 in), at least 60 mm (2.36 in), at least 70 mm (2.76 in), at most 75 mm (2.95 in), at most 65 mm (2.56 in), at most 55 mm (2.17 in), at most 45 mm (1.77 in), at most 35 mm (1.38 in), at most 25 mm (0.98 in), at most 15 mm (0.59 in), and/or at most 5 mm (0.20 in).

As further schematically illustrated in dashed lines in FIG. 2, outboard panel support 136 may include an outboard panel support transition region 137 extending between edge extension 132 and a remainder of the outboard panel support. As examples, outboard panel support transition region 137 may include and/or be a curved surface and/or a chamfered surface that extends at least substantially oblique to edge extension 132. Outboard panel support transition region 137 may be configured to engage at least a portion of panel 30 when the panel is operatively received by panel engagement portion 130. Stated differently, outboard panel support transition region 137 may include at least a portion of panel contact location 133.

Support structure engagement portion 110 may have any appropriate structure for coupling resilient mounting clip 100 to support structure 20, for supporting the pair of panels 30, and/or for operatively coupling each of the plurality of edge extensions 132. For example, and with continued reference to FIGS. 2-3, support structure engagement portion 110 may include a connecting member 124 that operatively couples the plurality of edge extensions 132 to one another, such that each edge extension is configured to resiliently flex with respect to the connecting member. As schematically illustrated in FIGS. 2-3, each edge extension 132 may extend from connecting member 124.

Additionally or alternatively, and as schematically illustrated in dashed lines in FIGS. 2-3, support structure engagement portion 110 may include at least one inboard panel support 122 configured to engage panel interior face 44 of a respective panel 30. Inboard panel support 122 may extend at least substantially parallel to each outboard panel support 136. Each edge extension 132 may extend from a corresponding inboard panel support, and/or may be configured to resiliently flex with respect to the corresponding inboard panel support. As schematically illustrated in dashed lines in FIG. 2, inboard panel support 122 may include an inboard panel support transition region 123 extending between edge extension 132 and a remainder of the inboard panel support. As examples, inboard panel support transition region 123 may include and/or be a curved surface and/or a chamfered surface that extends at least substantially oblique to edge extension 132. Inboard panel support transition region 123 may be configured to engage at least a portion of panel 30 when the panel is operatively received by panel engagement portion 130. Stated differently, inboard panel support transition region 123 may include at least a portion of panel contact location 133.

In an embodiment that includes at least one inboard panel support 122, connecting member 124 may include each inboard panel support. Alternatively, connecting member 124 may be spaced apart from each inboard panel support. For example, and as schematically illustrated in dashed lines in FIGS. 2-3, support structure engagement portion 110 may include at least one standoff member 118 extending from connecting member 124 such that each standoff member operatively couples the connecting member to a respective inboard panel support 122. In such an embodiment, connecting member 124 may extend at least substantially parallel to each inboard panel support 122. Additionally or alternatively, each standoff member 118 may be configured to resiliently flex with respect to connecting member 124, such as to permit each edge extension 132 to flex with respect to the connecting member.

Each standoff member 118 may serve to maintain a respective inboard panel support 122 in a spaced-apart position with respect to connecting member 124. In such an embodiment, resilient mounting clip 100 may retain each panel 30 in a spaced-apart relation to support structure 20, such as to permit a flow of air and/or moisture between the panel and the support structure. More specifically, and as schematically illustrated in FIGS. 2-3, each standoff member 118 may be configured such that the respective inboard panel support 122 is spaced apart from the connecting member by a standoff distance 120, as measured in a direction perpendicular to clip plane 109. As examples, standoff distance 120 may be at least 3 mm (0.12 in), at least 10 mm (0.39 in), at least 20 mm (0.79 in), at least 30 mm (1.18 in), at least 40 mm (1.57 in), at least 50 mm (1.97 in), at least 60 mm (2.36 in), at least 70 mm (2.76 in), at most 75 mm (2.95 in), at most 65 mm (2.56 in), at most 55 mm (2.17 in), at most 45 mm (1.77 in), at most 35 mm (1.38 in), at most 25 mm (0.98 in), at most 15 mm (0.59 in), and/or at most 5 mm (0.20 in).

With continued reference to FIGS. 2-3, support structure engagement portion 110 may include at least one fastener aperture 112 configured to receive fastener 28 to operatively couple resilient mounting clip 100 to support structure 20. As examples, fastener 28 may include and/or be a nail, a screw, a tack, and/or a bolt configured to be driven into support structure 20. Fastener aperture 112 may be defined in any appropriate component of support structure engagement portion 110. As an example, connecting member 124 and/or inboard panel support 122 may define each fastener aperture 112. Each fastener aperture 112 may extend along any appropriate direction. For example, and as schematically illustrated in FIGS. 2-3, each fastener aperture 112 may extend along a direction that is at least substantially perpendicular to clip plane 109. Alternatively, and as further schematically illustrated in FIG. 2, each fastener aperture 112 may extend along a direction that is oblique to clip plane 109.

Support structure engagement portion 110 may include any appropriate number of fastener apertures 112, such as one fastener aperture, two fastener apertures, three fastener apertures, or more than three fastener apertures. In an example of support structure engagement portion 110 that includes more than one fastener aperture 112, the support structure engagement portion may be configured such that each fastener aperture receives a respective fastener 28 when resilient mounting clip 100 is operatively coupled to support structure 20. Alternatively, in an example of support structure engagement portion 110 that includes more than one fastener aperture 112, the plurality of fastener apertures may facilitate positioning resilient mounting clip 100 relative to support structure 20 such that at least one fastener aperture is aligned with the support structure.

As further schematically illustrated in FIGS. 2-3, support structure engagement portion 110 may include at least one channel leg 114 extending away from panel engagement portion 130 and configured to be selectively received within channel 26 of installation rail 24. Each channel leg 114 may extend from connecting member 124, and/or may be configured to resiliently flex with respect to the connecting member. Each channel leg 114 may be configured to resiliently flex with respect to panel engagement portion 130, such as to enable the channel leg to be selectively inserted into and removed from channel 26. For example, each channel leg 114 may extend in such a manner that the channel legs restrict resilient mounting clip 100 from being inserted into and/or removed from channel 26 until the channel legs are sufficiently flexed and/or deflected. As a more specific example, and as best schematically illustrated in FIG. 3, each channel leg 114 may include a channel knee 116 configured to restrict the channel leg from being removed from channel 26.

Figure 4:
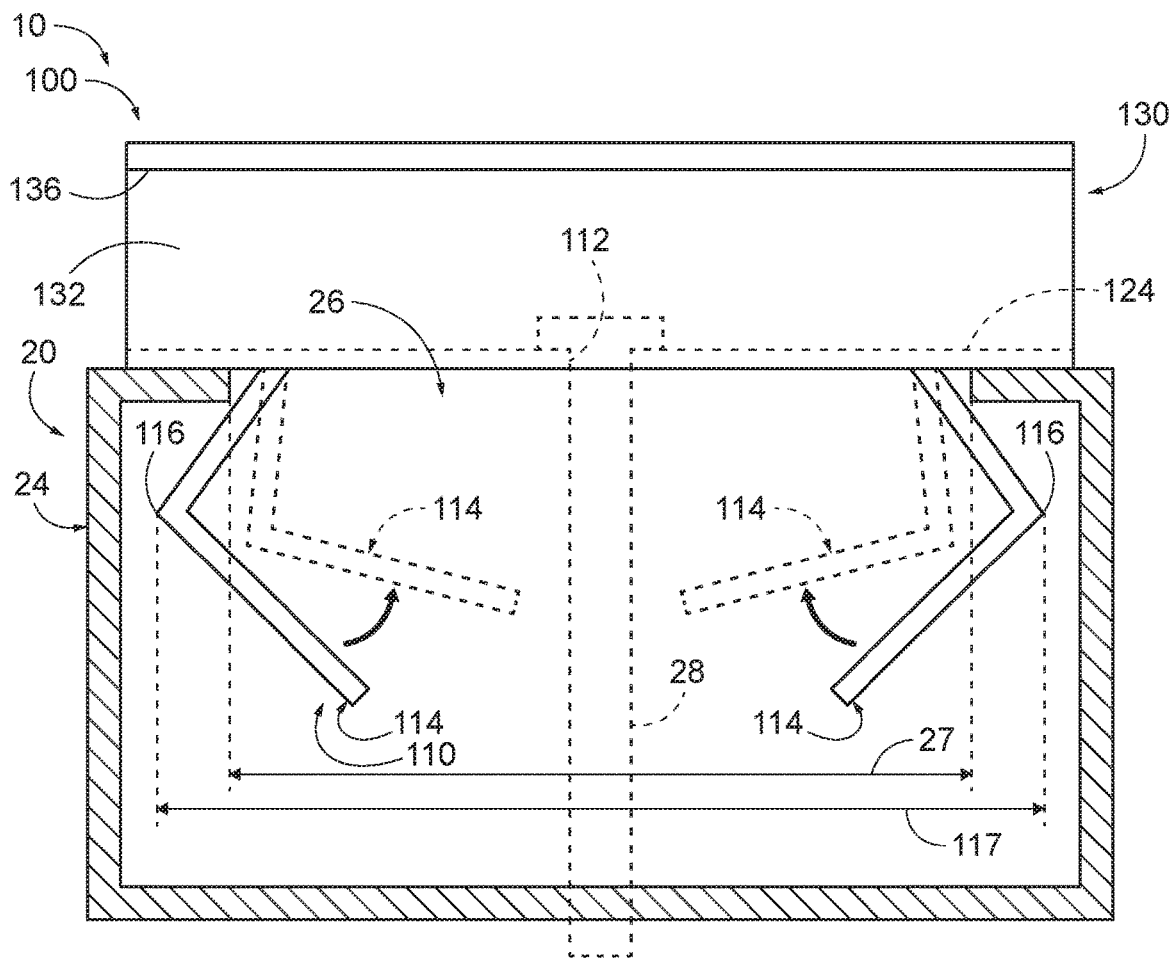
FIG. 4 is a schematic side elevation view illustrating another example of a resilient mounting clip installed in the panel mount system according to the present disclosure.

FIG. 4 is a less schematic illustration of an example of resilient mounting clip 100 that is operatively coupled to a support structure 20 in the form of an installation rail 24 with channel 26. In the example of FIG. 4, support structure engagement portion 110 of resilient mounting clip 100 includes a pair of channel legs 114 with a corresponding pair of channel knees 116 that restrict resilient mounting clip 100 from being removed from channel 26. As illustrated in dashed lines in FIG. 4, the pair of channel legs 114 are configured to resiliently flex toward one other to permit resilient mounting clip 100 to be inserted into and removed from installation rail 24. For example, and as illustrated in FIG. 4, channel 26 may have a minimum channel width 27, as measured in a direction perpendicular to a length of installation rail 24, and channel knees 116 of channel legs 114 may be separated by a nominal knee separation 117 that is greater than the minimum channel width. In such an embodiment, each channel leg 114 may be configured to resiliently flex with respect to panel engagement portion 130 such that a distance between channel knees 116 is less than or equal to minimum channel width 27.

Each channel knee 116 may be configured such that engagement of each channel leg 114 with installation rail 24 serves to bias the channel legs toward one another when resilient mounting clip 100 is inserted into and/or removed from the installation rail. Additionally or alternatively, channel legs 114 and/or channel knees 116 may be configured such that resilient mounting clip 100 is positively retained against installation rail 24 when the resilient mounting clip is received within channel 26. Stated differently, channel legs 114 may be configured to frictionally engage installation rail 24 to restrict translation of resilient mounting clip 100 along channel 26. For example, channel legs 114 may be configured to engage installation rail 24 to restrict resilient mounting clip 100 from translating along channel 26 until manually repositioned by a user and/or to at least partially support a weight of panel 30 that is received by the resilient mounting clip.

As further illustrated in FIG. 4, an example of resilient mounting clip 100 that is configured to be retained within installation rail 24 by channel legs 114 additionally may be secured to the installation rail by fastener 28 extending through each of the resilient mounting clip and the installation rail. In such an embodiment, fastener 28 may be configured to at least partially support a weight of panel 30 that is received by the corresponding resilient mounting clip 100. In an embodiment of panel mount system 10 that includes a plurality of such resilient mounting clips 100, each resilient mounting clip may be secured to installation rail 24 by a respective fastener 28. Alternatively, only a subset of the resilient mounting clips may be secured to the installation rail by the respective fasteners, such as every other resilient mounting clip installed in a given installation rail, every third resilient mounting clip installed in a given installation rail, etc.

Figure 5:
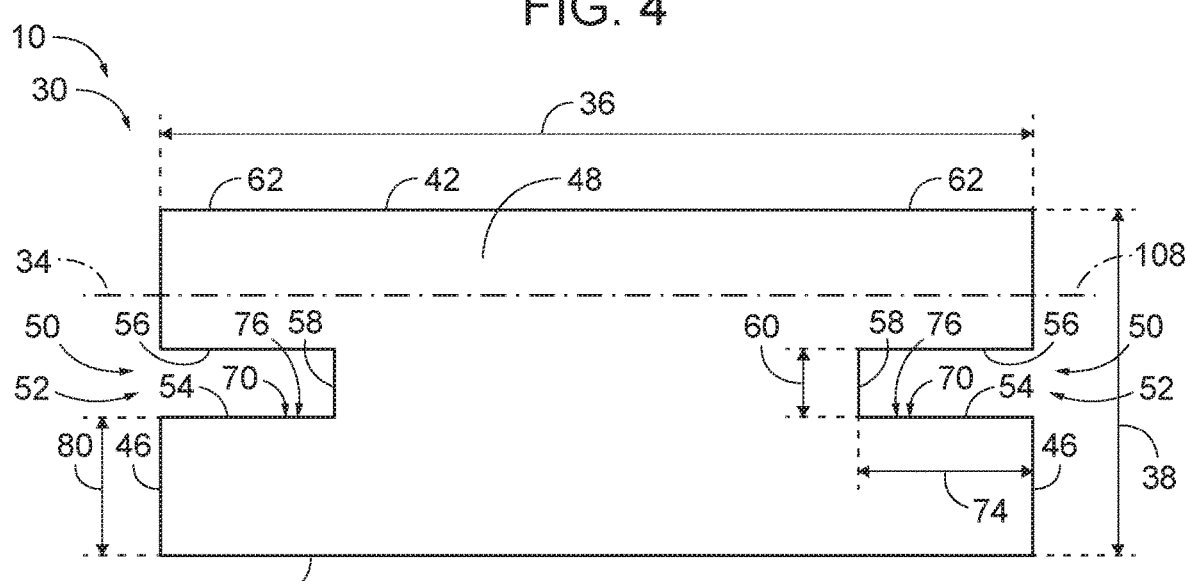
FIG. 5 is a schematic end elevation view illustrating an example of a panel according to the present disclosure.
Figure 6:
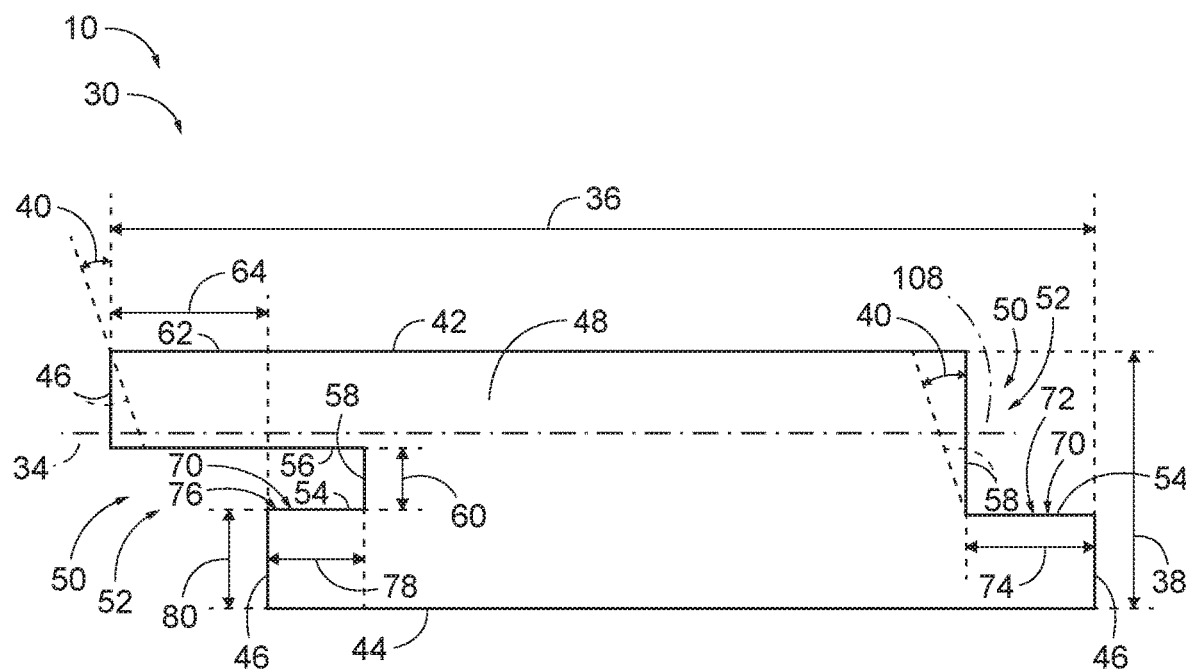
FIG. 6 is a schematic end elevation view illustrating additional examples of panels according to the present disclosure.

FIGS. 5-6 schematically illustrate examples of panels 30 that may be utilized in conjunction with resilient mounting clips 100 according to the present disclosure. Specifically, each of FIGS. 5-6 is a schematic end-on view of lateral edges 48 of examples of panels 30. As more specific examples, the configuration illustrated in FIG. 5 may correspond to that of a panel 30 utilized in a panel mount system 10 that forms a portion of a deck, while the configuration illustrated in FIG. 6 may correspond to that of a panel 30 utilized in a panel mount system 10 that forms a portion of a rain screen. However, this is not required, and the examples of panels 30 schematically illustrated in FIGS. 5-6 may be utilized in conjunction with any appropriate panel mount systems 10, and the panel mount systems 10 and resilient mounting clips 100 disclosed herein may be used with panels 30 having other relative shapes, including rectilinear shapes.

FIGS. 5-6 illustrate examples of joint structures 50 of panels 30. As schematically illustrated in FIGS. 5-6, joint structure 50 may include an exterior joint face 54 that extends at least substantially parallel to panel exterior face 42. Each exterior joint face 54 may face generally away from support structure 20 when panel 30 is operatively received by resilient mounting clip 100 and when the resilient mounting clip is operatively coupled to the support structure. In such an embodiment, outboard panel support 136 of resilient mounting clip 100 may engage exterior joint face 54 when panel 30 is operatively received by the resilient mounting clip.

As further schematically illustrated in FIGS. 5-6, joint structure 50 may include an interior joint face 56 that extends at least substantially parallel to panel exterior face 42. Each interior joint face 56 may face generally toward support structure 20 when panel 30 is operatively received by resilient mounting clip 100 and when the resilient mounting clip is operatively coupled to the support structure. In such an embodiment, outboard panel support 136 of resilient mounting clip 100 may engage interior joint face 56 when panel 30 is operatively received by the resilient mounting clip.

With continued reference to FIGS. 5-6, joint structure 50 additionally may include a shoulder 58 that extends at least substantially perpendicular to panel plane 108. In such an embodiment, outboard panel support 136 of resilient mounting clip 100 may engage shoulder 58 when panel 30 is operatively received by the resilient mounting clip, such as when each edge extension 132 is in the flexed position. In an example of joint structure 50 that includes exterior joint face 54 and interior joint face 56, shoulder 58 may extend between the exterior joint face and the interior joint face. As illustrated in FIGS. 5-6, shoulder 58 may be characterized by a shoulder depth 60, as measured in a direction perpendicular to panel plane 108. As examples, shoulder depth 60 may be at least 1 mm (0.04 in), at least 3 mm (0.12 in), at least 5 mm (0.20 in), at least 10 mm (0.39 in), at least 20 mm (0.79 in), at least 30 mm (1.18 in), at most 35 mm (1.38 in), at most 25 mm (0.98 in), at most 15 mm (0.59 in), at most 7 mm (0.28 in), and/or at most 2 mm (0.08 in).

In an example of joint structure 50 that includes shoulder 58, and as further schematically illustrated in FIGS. 5-6, joint structure 50 additionally may include a cheek 70 that extends away from the shoulder, such that the cheek includes and/or defines exterior joint face 54. In such an example, cheek 70 may be characterized by a cheek length 74, as measured in a direction parallel to lateral axis 34 of panel 30 and between shoulder 58 and longitudinal edge 46. As examples, cheek length 74 may be at least 5 mm (0.20 in), at least 10 mm (0.39 in), at least 20 mm (0.79 in), at least 30 mm (1.18 in), at least 40 mm (1.57 in), at most 45 mm (1.77 in), at most 35 mm (1.38 in), at most 25 mm (0.98 in), at most 15 mm (0.59 in), and/or at most 7 mm (0.28 in). As further schematically illustrated in FIGS. 5-6, cheek 70 additionally or alternatively may be characterized by a cheek depth 80, as measured in a direction perpendicular to panel plane 108 and between panel interior face 44 and exterior joint face 54. As examples, cheek depth 80 may be at least 5 mm (0.20 in), at least 10 mm (0.39 in), at least 15 mm (0.59 in), at least 20 mm (0.79 in), at least 25 mm (0.98 in), at most 30 mm (1.18 in), at most 27 mm (1.06 in), at most 22 mm (0.87 in), at most 17 mm (0.67 in), at most 12 mm (0.47 in), and/or at most 7 mm (0.28 in). As used herein, cheek 70 additionally or alternatively may be referred to as a joint extension and/or a ledge.

As further schematically illustrated in FIGS. 5-6, joint structure 50 additionally or alternatively may include a joint overhang 62. Joint overhang 62 may extend at least partially, and optionally fully, over exterior joint face 54, such as to at least substantially conceal the respective resilient mounting clip 100 from view when panel 30 is operatively received by the resilient mounting clip. In such an example, joint overhang 62 additionally may extend at least partially over exterior joint face 54 of an adjacent panel 30 when each panel is operatively received by resilient mounting clip 100. An example of such a configuration is illustrated in FIG. 7, discussed below.

With continued reference to FIGS. 5-6, panel 30 may have any appropriate dimensions. For example, panel 30 may be characterized by a panel width 36, as measured in a direction parallel to lateral axis 34. As more specific examples, panel width 36 may be at least 30 mm (1.18 in), at least 50 mm (1.97 in), at least 100 mm (3.94 in), at least 130 mm (5.12 in), at least 150 mm (5.91 in), at least 200 mm (7.87 in), at most 250 mm (9.84 in), at most 170 mm (6.69 in), at most 120 mm (4.72 in), and/or at most 70 mm (2.76 in). As another example, panel 30 may be characterized by a panel thickness 38, as measured in a direction perpendicular to panel plane 108 and between panel exterior face 42 and panel interior face 44. As more specific examples, panel thickness 38 may be at least 5 mm (0.20 in), at least 10 mm (0.39 in), at least 15 mm (0.59 in), at least 20 mm (0.79 in), at least 25 mm (0.98 in), at most 30 mm (1.18 in), at most 27 mm (1.06 in), at most 22 mm (0.87 in), at most 17 mm (0.67 in), at most 12 mm (0.47 in), and/or at most 7 mm (0.28 in).

As further schematically illustrated in FIG. 6, joint structure 50 may be configured such that at least a portion of at least one longitudinal edge 46 of panel 30 is beveled with a bevel angle 40, as measured between the longitudinal edge and a direction perpendicular to panel plane 108. As examples, bevel angle 40 may be at least 1 degree, at least 3 degrees, at least 5 degrees, at least 10 degrees, at least 20 degrees, at least 30 degrees, at least 40 degrees, at most 45 degrees, at most 35 degrees, at most 25 degrees, at most 15 degrees, at most 7 degrees, and/or at most 2 degrees. In such an embodiment, and as schematically illustrated in FIG. 6, shoulder 58 may include and/or be a beveled surface of longitudinal edge 46. Such a configuration may prevent or restrict water accumulation upon shoulder 58, such as in an example in which panel plane 108 is at least substantially vertical with respect to a ground surface.

Figure 7:
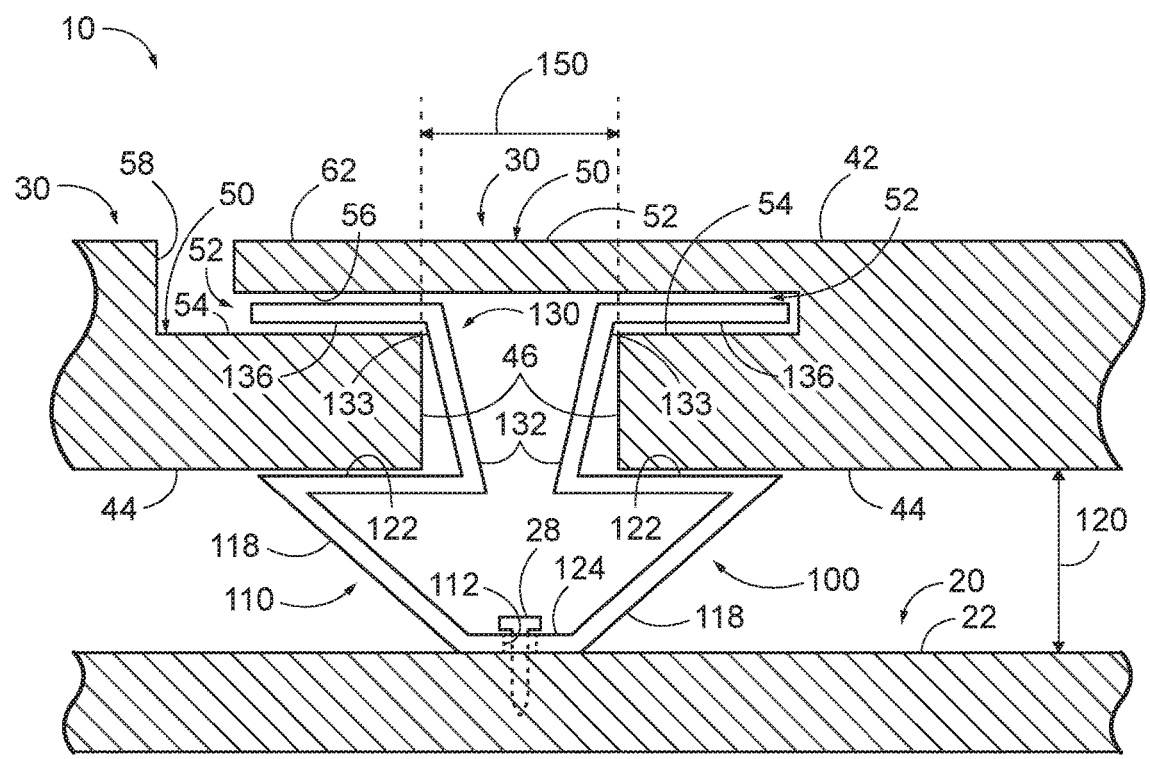
FIG. 7 is a schematic fragmentary cross-sectional side elevation view illustrating an example of a resilient mounting clip installed in a panel mount system according to the present disclosure.
Figure 8:
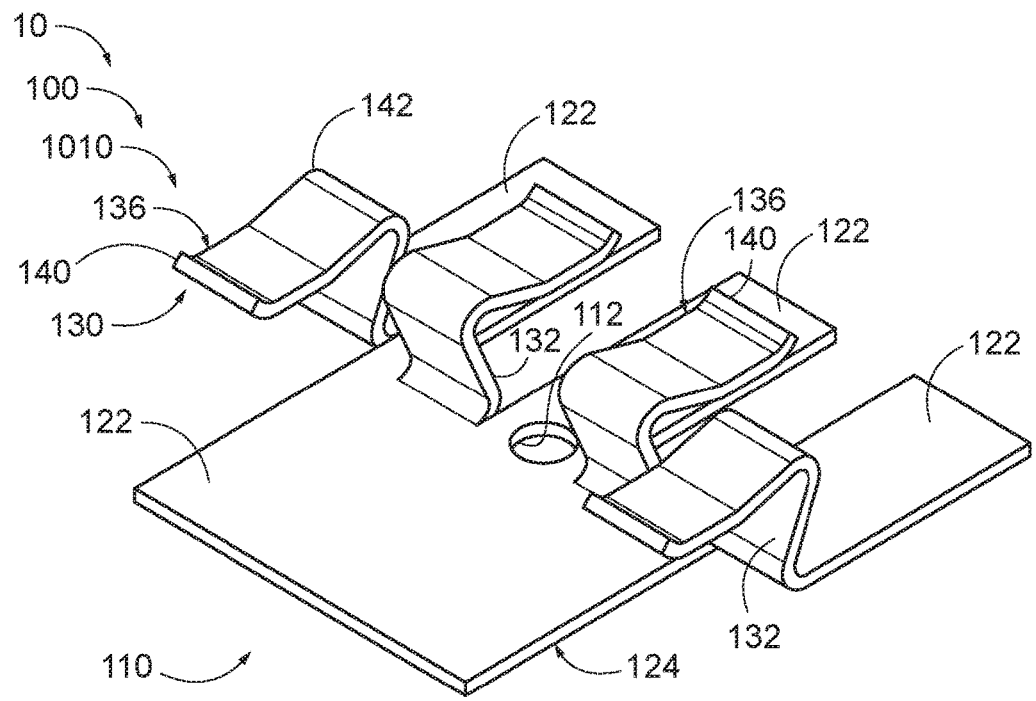
FIG. 8 is a top side isometric view illustrating the resilient mounting clip of FIGS. 9-10 according to the present disclosure.
Figure 9:
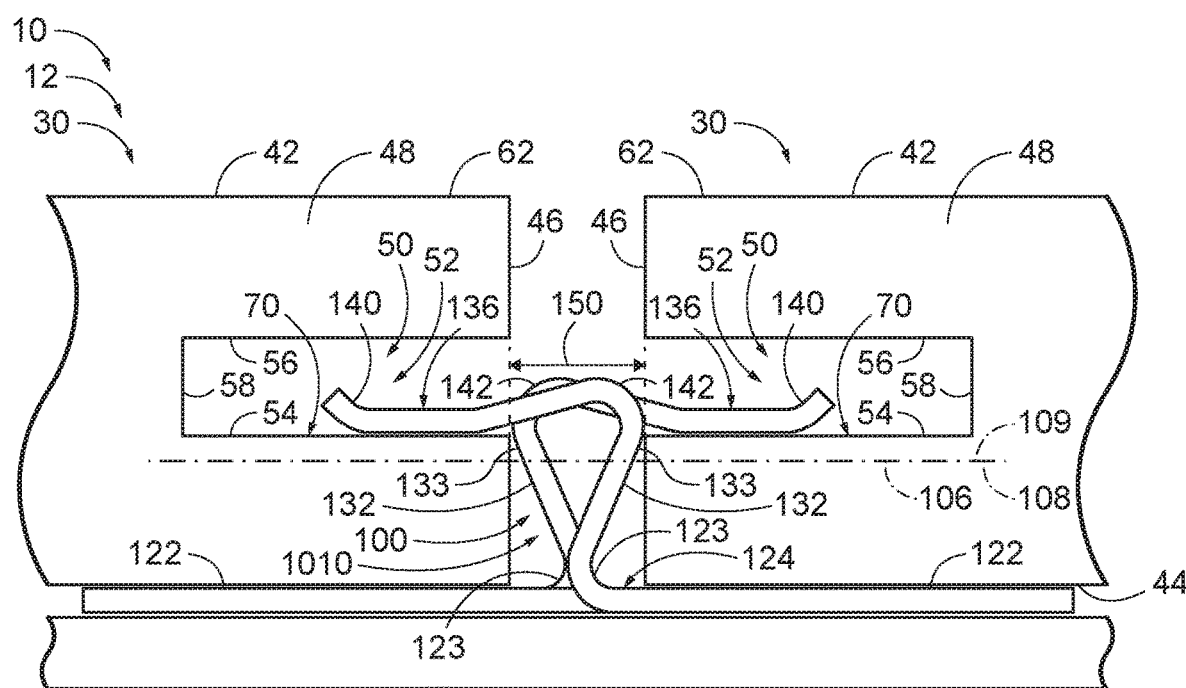
FIG. 9 is a fragmentary cross-sectional side elevation view illustrating another example of a resilient mounting clip installed in a panel mount system and in an uncompressed state according to the present disclosure.
Figure 10:
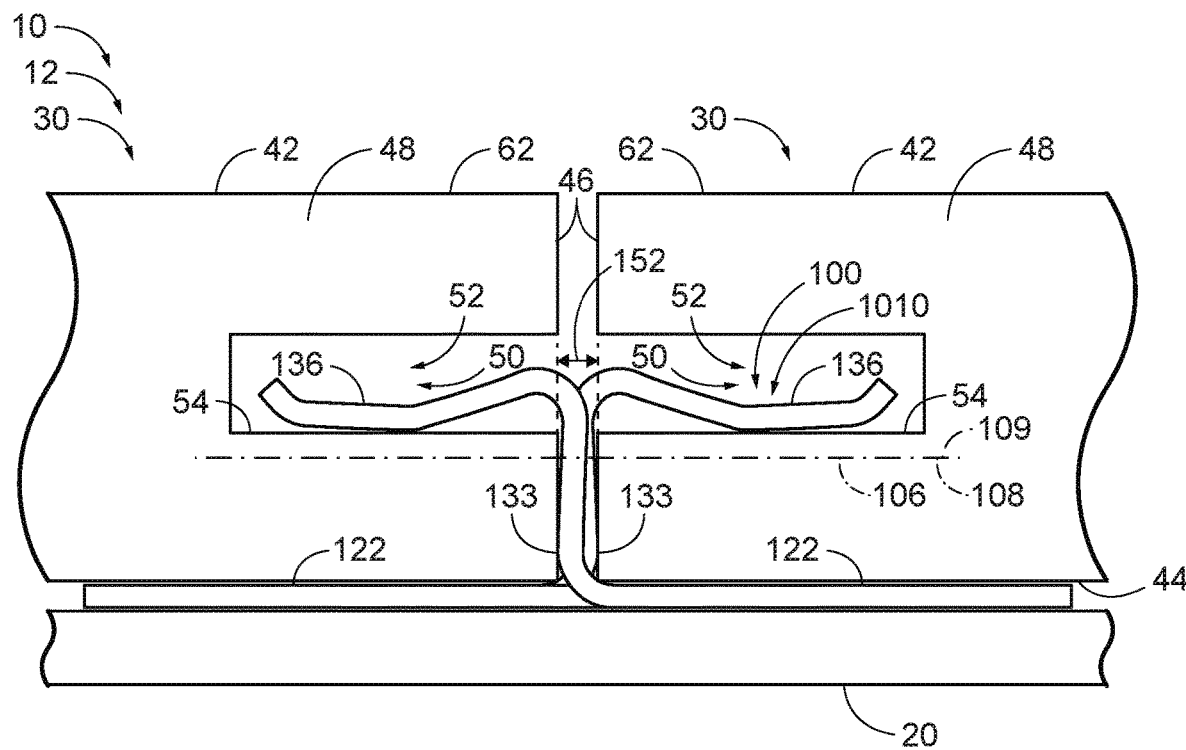
FIG. 10 is a fragmentary cross-sectional side elevation view illustrating the panel mount system of FIG. 9 with the resilient mounting clip in a compressed state according to the present disclosure.

FIGS. 7 and 9-10 illustrate examples of portions of panel mount systems 10 with resilient mounting clips 100 installed between two panels 30, while FIG. 8 illustrates the resilient mounting clip 100 shown in FIGS. 9-10. Specifically, FIG. 7 is a schematic illustration of an example of resilient mounting clip 100 that is installed on support structure 20 and that receives a pair of panels 30. FIG. 8 illustrates a resilient mounting clip 1010, which is an example of resilient mounting clip 100, while FIGS. 9-10 illustrate resilient mounting clip 1010 installed on support structure 20 and receiving a pair of panels 30 with edge extensions 132 in the nominal position (FIG. 9) and in the flexed position (FIG. 10).

In the example of FIG. 7, support structure 20 is a joist 22, and resilient mounting clip 100 is fastened to the joist by fastener 28. The resilient mounting clip includes a pair of outboard panel supports 136 and a pair of inboard panel supports 122 that are spaced apart from support structure 20 by a corresponding pair of standoff members 118. Thus, panel interior face 44 of each panel 30 is spaced apart from support structure 20 by standoff distance 120. FIG. 7 additionally illustrates an example of joint structure 50. In the example of FIG. 7, joint structure 50 of each panel 30 that is received by resilient mounting clip 100 includes exterior joint face 54 that extends parallel to panel exterior face 42, and each outboard panel support 136 of resilient mounting clip 100 engages exterior joint face 54. Additionally, in the example of FIG. 7, joint structure 50 includes joint overhang 62 that at least substantially conceals resilient mounting clip 100 from view when the respective panel 30 is operatively received by resilient mounting clip 100.

As discussed, FIG. 8 illustrates resilient mounting clip 1010, which also is illustrated in FIGS. 9-10. As illustrated in FIG. 8, resilient mounting clip 1010 includes a substantially planar structure that forms each of support structure engagement portion 110, connecting member 124, and each of four inboard panel supports 122. Connecting member 124 is operatively coupled to each of four outboard panel supports 136 by a respective edge extension 132. Each outboard panel support 136 includes elbow projection 142 extending away from support structure engagement portion 110, and additionally includes lip 140 extending away from the support structure engagement portion. Additionally, each edge extension 132 is angled generally away from a direction in which a respective outboard panel support 136 extends from the edge extension. Stated differently, each edge extension 132 may be described as being angled generally away from a respective panel 30 that is received by the respective panel engagement portion 130 when resilient mounting clip 100 is operably installed in panel mount system 10. Each outboard panel support 136 is misaligned with each inboard panel support 122, as viewed along a direction perpendicular to clip plane 109 (illustrated in FIGS. 9-10). Resilient mounting clip 1010 includes a single fastener aperture 112 that is aligned with each edge extension 132. Stated differently, resilient mounting clip 1010 is configured such that fastener aperture 112 is linearly aligned with the locations at which each edge extension 132 meets connecting member 124.

FIGS. 9-10 illustrate a portion of panel mount system 10 that includes resilient mounting clip 1010 operatively coupled to support structure 20 and receiving a pair of panels 30. As illustrated in FIGS. 9-10, resilient mounting clip 1010 is configured such that each outboard panel support 136 contacts exterior joint face 54 of the respective panel 30. FIGS. 9-10 may be described as illustrating a portion of panel mount system 10 in which panels 30 collectively form structural surface 12 in the form of a deck.

As additionally illustrated in FIG. 9, when each edge extension 132 of resilient mounting clip 1010 is in the nominal position, each edge extension engages a respective panel 30 that is different than the panel that is engaged by the respective outboard panel support 136. Stated differently, resilient mounting clip 1010 is configured such that, when each edge extension 132 is in the nominal position, each panel contact location 133 is on an opposite side of the corresponding edge extension relative to the outboard panel support that extends from the corresponding edge extension.

FIGS. 9-10 additionally illustrate panel contact locations 133 of resilient mounting clip 1010 moving toward each other along compression axis 106 as each edge extension 132 transitions from the nominal position (FIG. 9) to the flexed position (FIG. 10). More specifically, and as illustrated in FIGS. 2, 7, and 9, the plurality of edge extensions 132 may be characterized by a nominal edge spacing 150, as measured between the respective panel contact locations 133 of a pair of edge extensions 132 that are configured to engage distinct respective panels and along a direction parallel to compression axis 106 when each edge extension is in the nominal position. As examples, nominal edge spacing 150 may be at least 3 mm (0.12 in), at least 10 mm (0.39 in), at least 20 mm (0.79 in), at least 30 mm (1.18 in), at least 40 mm (1.57 in), at least 50 mm (1.97 in), at least 60 mm (2.36 in), at least 70 mm (2.76 in), at most 75 mm (2.95 in), at most 65 mm (2.56 in), at most 55 mm (2.17 in), at most 45 mm (1.77 in), at most 35 mm (1.38 in), at most 25 mm (0.98 in), at most 15 mm (0.59 in), and/or at most 5 mm (0.20 in). As illustrated in FIG. 10, the plurality of edge extensions 132 further may be characterized by a compressed edge spacing 152, as measured between the respective panel contact locations 133 of a pair of edge extensions 132 that are configured to engage distinct respective panels and along a direction parallel to compression axis 106 when each edge extension is in the flexed position. As examples, compressed edge spacing 152 may be at least 1 mm (0.04 in), at least 3 mm (0.12 in), at least 10 mm (0.39 in), at least 20 mm (0.79 in), at least 30 mm (1.18 in), at least 40 mm (1.57 in), at least 50 mm (1.97 in), at least 60 mm (2.36 in), at most 65 mm (2.56 in), at most 55 mm (2.17 in), at most 45 mm (1.77 in), at most 35 mm (1.38 in), at most 25 mm (0.98 in), at most 15 mm (0.59 in), at most 5 mm (0.20 in), and/or at most 2 mm (0.08 in).

FIGS. 11-26 illustrate additional examples of specific embodiments of resilient mounting clips 100 and/or of panel mount systems 10 including the resilient mounting clips. However, examples of resilient mounting clips 100 according to the present disclosure are not limited to the examples of FIGS. 11-26, and it additionally is within the scope of the present disclosure that any of the examples of FIGS. 11-26 additionally or alternatively may incorporate any appropriate components, features, etc. of any other example of FIGS. 11-26 or of FIGS. 1-10. Additionally, any of the examples illustrated and/or discussed in connection with any of FIGS. 1-10 may include any appropriate components, features, etc. illustrated in the examples of any of FIGS. 11-26.

Figure 11:
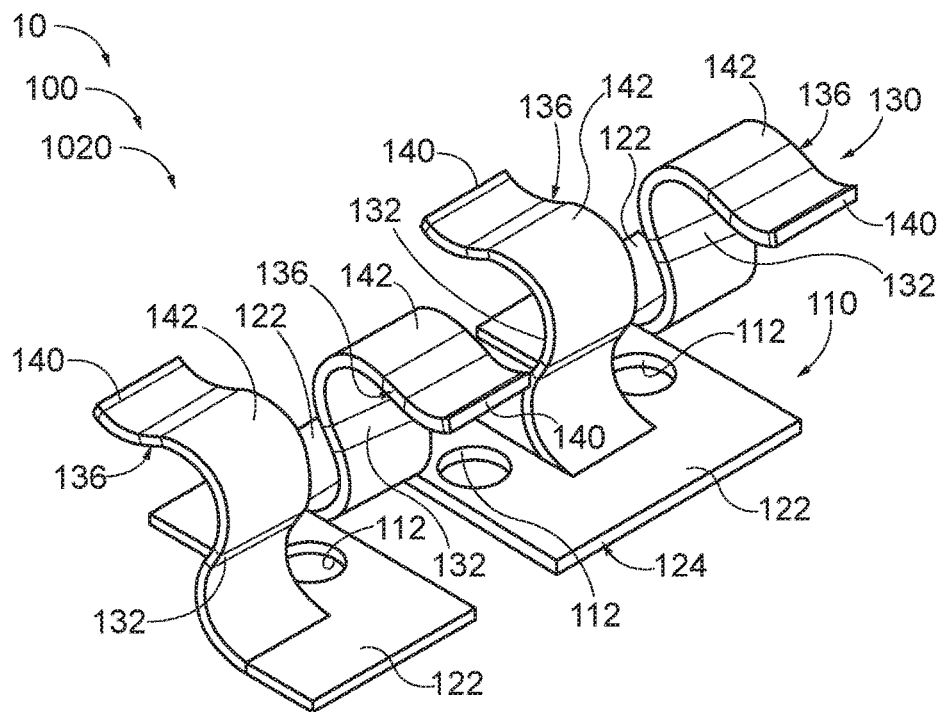
FIG. 11 is a top side isometric view illustrating another example of a resilient mounting clip according to the present disclosure.

FIG. 11 illustrates a resilient mounting clip 1020, which is an example of resilient mounting clip 100. Resilient mounting clip 1020 is substantially similar in form to resilient mounting clip 1010. Unlike resilient mounting clip 1010, however, connecting member 124 of resilient mounting clip 1020 includes three fastener apertures 112, and the four outboard panel supports 136 extend from the respective edge extensions 132 in alternating directions. Additionally, each edge extension 132 of resilient mounting clip 1020 is formed from two curved portions that each are substantially semicircular in cross-section. In this manner, each edge extension 132 is at least substantially curved between support structure engagement portion 110 and panel engagement portion 130.

Figure 12:
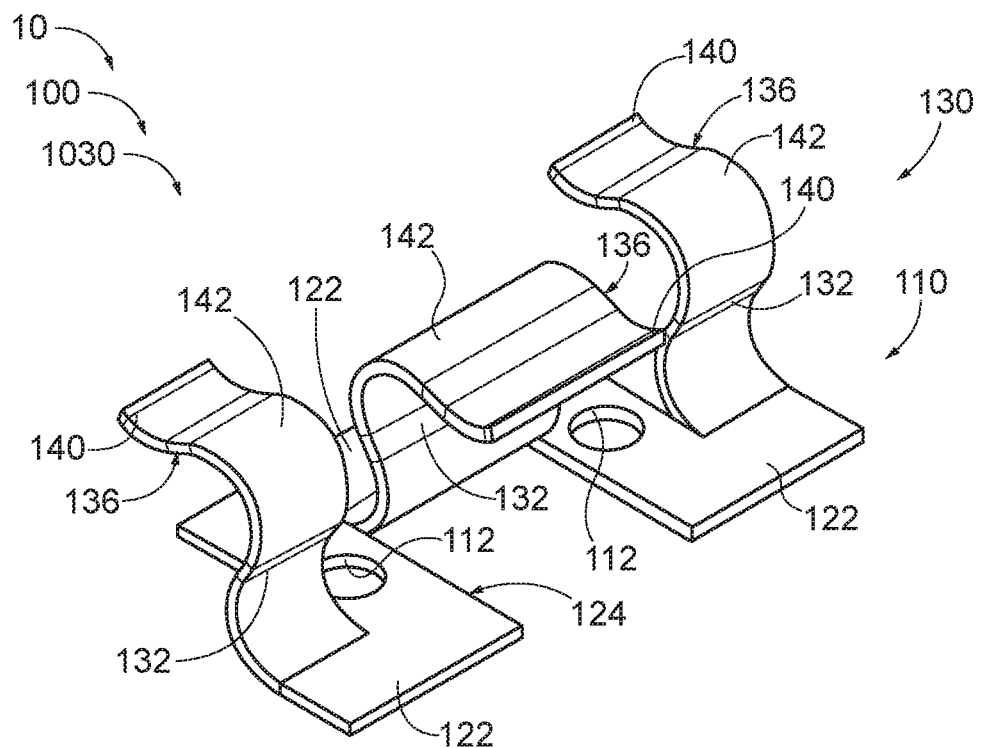
FIG. 12 is a top side isometric view illustrating another example of a resilient mounting clip according to the present disclosure.

FIG. 12 illustrates a resilient mounting clip 1030, which is an example of resilient mounting clip 100. Resilient mounting clip 1030 is substantially similar in form to resilient mounting clip 1020, with the exception that resilient mounting clip 1030 includes three outboard panel supports 136 and two fastener apertures 112.

Figure 13:
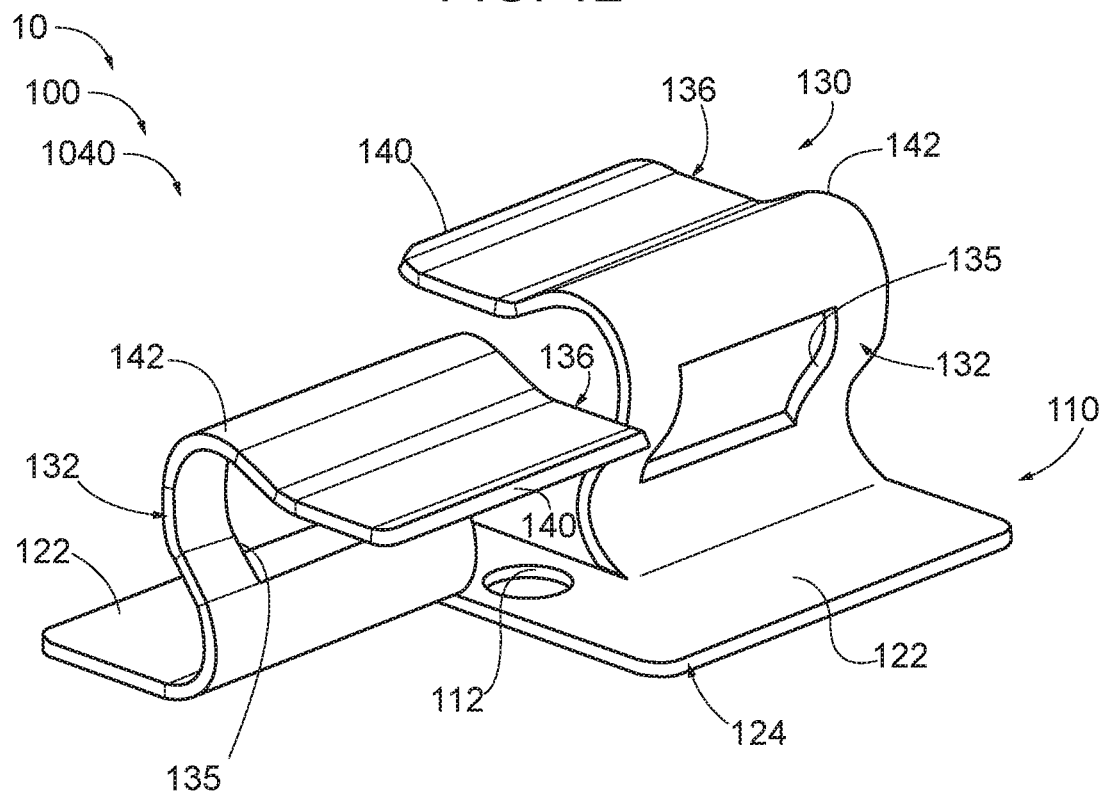
FIG. 13 is a top side isometric view illustrating another example of a resilient mounting clip according to the present disclosure.

FIG. 13 illustrates a resilient mounting clip 1040, which is an example of resilient mounting clip 100. Specifically, resilient mounting clip 1040 is an example of resilient mounting clip 100 that includes two edge extensions 132 and a single fastener aperture 112. Each edge extension 132 of resilient mounting clip 1040 includes an example of an edge extension cutout 135 in the form of an aperture defined by the edge extension. As discussed herein, it is within the scope of the present disclosure that any of the examples disclosed and/or illustrated herein may include (and/or may be modified to include) edge extension cutouts 135 as illustrated in FIG. 13.

Figure 14:
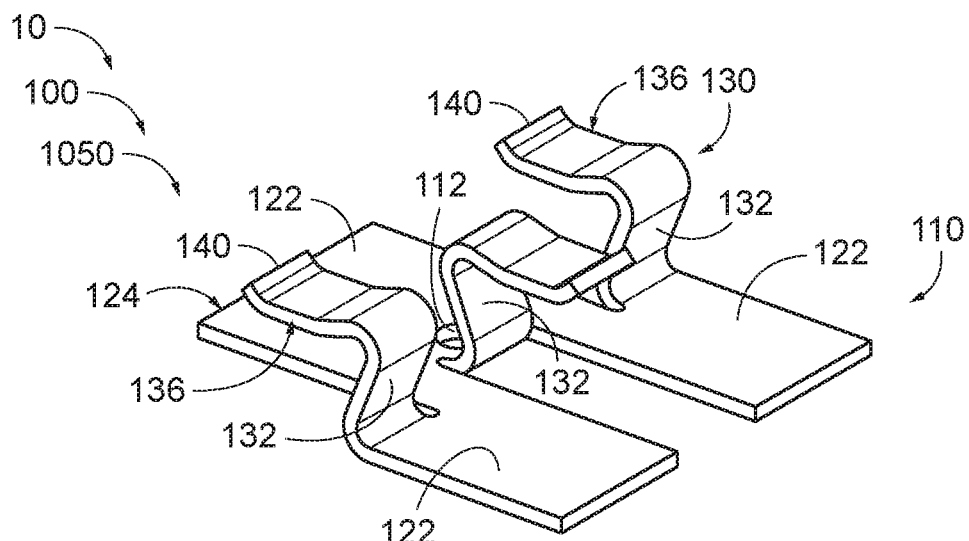
FIG. 14 is a top side isometric view illustrating another example of a resilient mounting clip according to the present disclosure.
Figure 15:
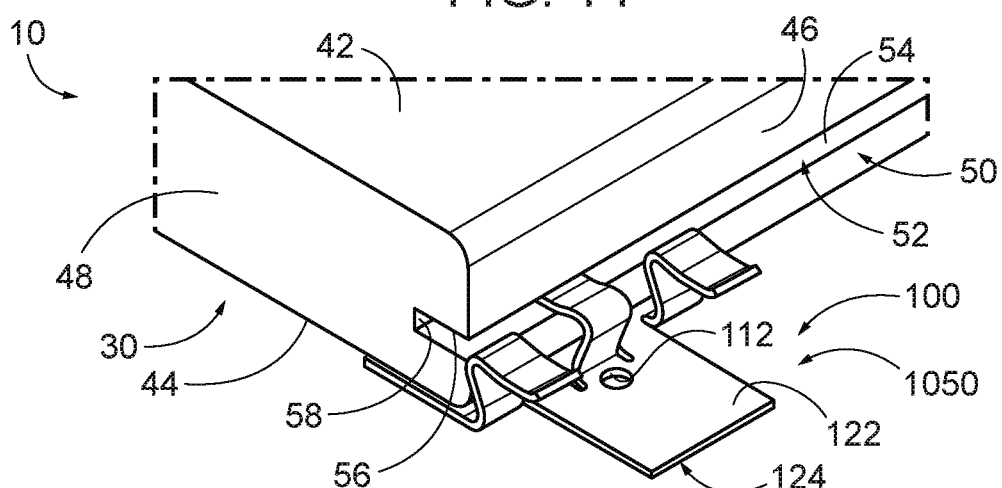
FIG. 15 is a fragmentary top side isometric view illustrating a portion of a partially assembled panel mount system with the resilient mounting clip of FIG. 14, according to the present disclosure.

FIG. 14 illustrates a resilient mounting clip 1050, which is an example of resilient mounting clip 100. Resilient mounting clip 1050 is substantially similar in form to resilient mounting clip 1010. Specifically, and as illustrated in FIG. 14, resilient mounting clip 1050 includes a substantially planar structure that forms each of support structure engagement portion 110, connecting member 124, and each of three inboard panel supports 122. Each of the three inboard panel supports is operatively coupled to a respective outboard panel support 136 by a respective edge extension 132. Each outboard panel support 136 includes elbow projection 142 extending away from support structure engagement portion 110, and additionally includes lip 140 extending away from the support structure engagement portion. Additionally, each edge extension 132 is angled generally away from a direction in which a respective outboard panel support 136 extends from the edge extension. Stated differently, each edge extension 132 may be described as being angled generally away from a respective panel 30 that is received by the respective panel engagement portion 130 when resilient mounting clip 100 is operably installed in panel mount system 10. Each outboard panel support 136 is misaligned with each inboard panel support 122. FIG. 15 illustrates a portion of panel mount system 10 in which resilient mounting clip 1050 is positioned relative to a panel 30 such that joint overhang 62 of the panel partially covers outboard panel support 136.

Figure 16:
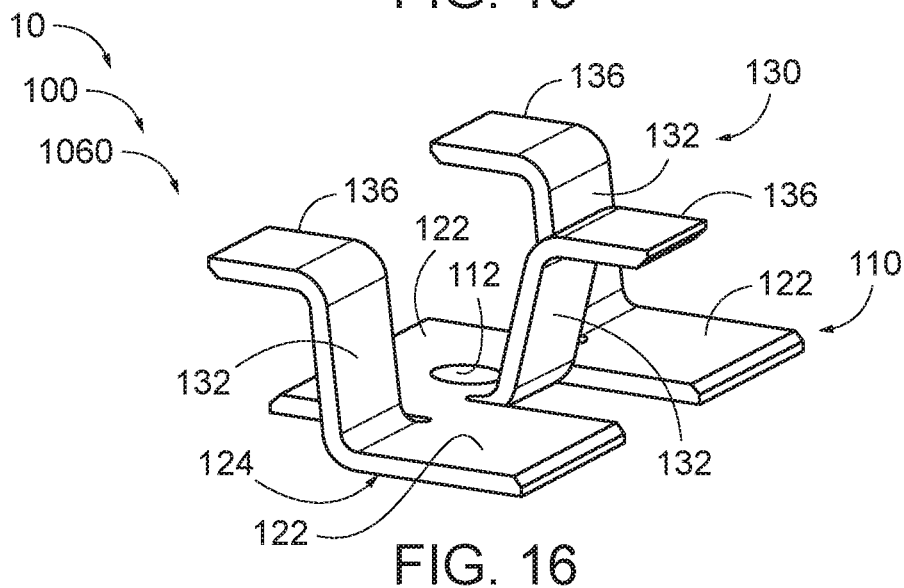
FIG. 16 is a top side isometric view illustrating another example of a resilient mounting clip according to the present disclosure.

FIG. 16 illustrates a resilient mounting clip 1060, which is an example of resilient mounting clip 100. As illustrated in FIG. 16, resilient mounting clip 1060 includes a single substantially planar structure that forms each of support structure engagement portion 110, connecting member 124, and each of three inboard panel supports 122. Each of the three inboard panel supports is operatively coupled to a respective outboard panel support 136 by a respective edge extension 132. Each outboard panel support 136 is misaligned with each inboard panel support 122.

Figure 17:
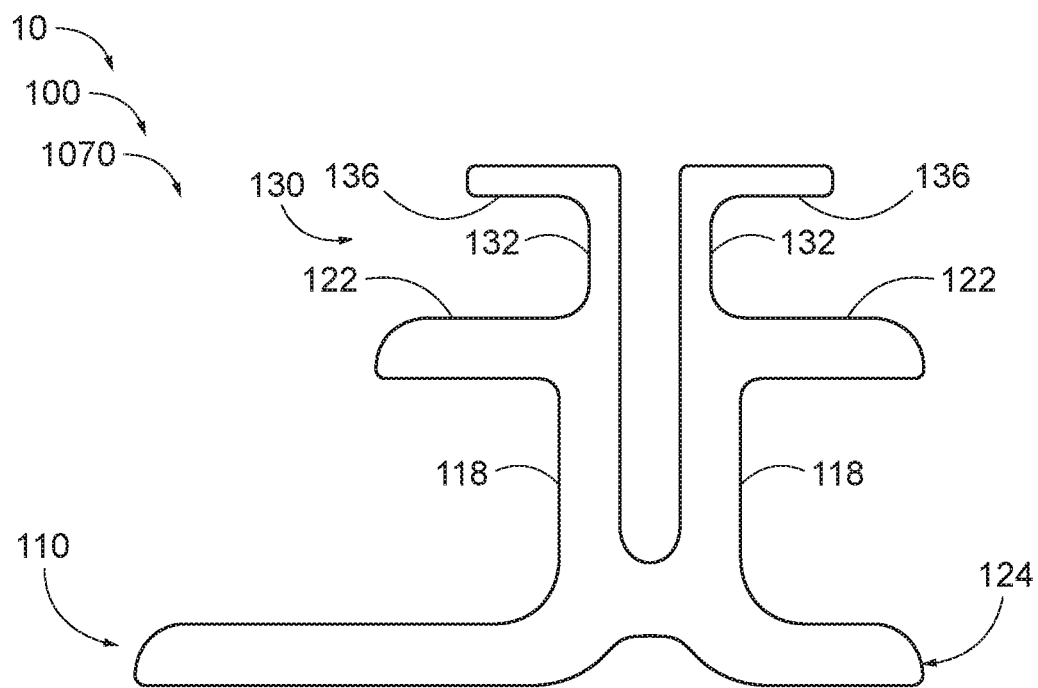
FIG. 17 is a side elevation view illustrating another example of a resilient mounting clip according to the present disclosure.
Figure 18:
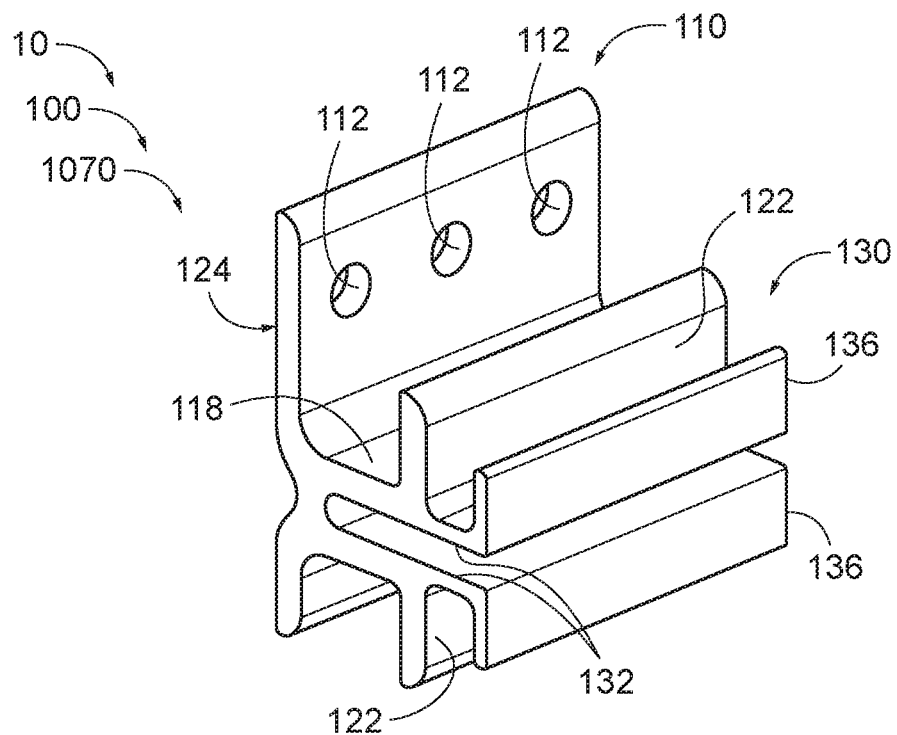
FIG. 18 is a top side isometric view illustrating the resilient mounting clip of FIG. 17.
Figure 19:
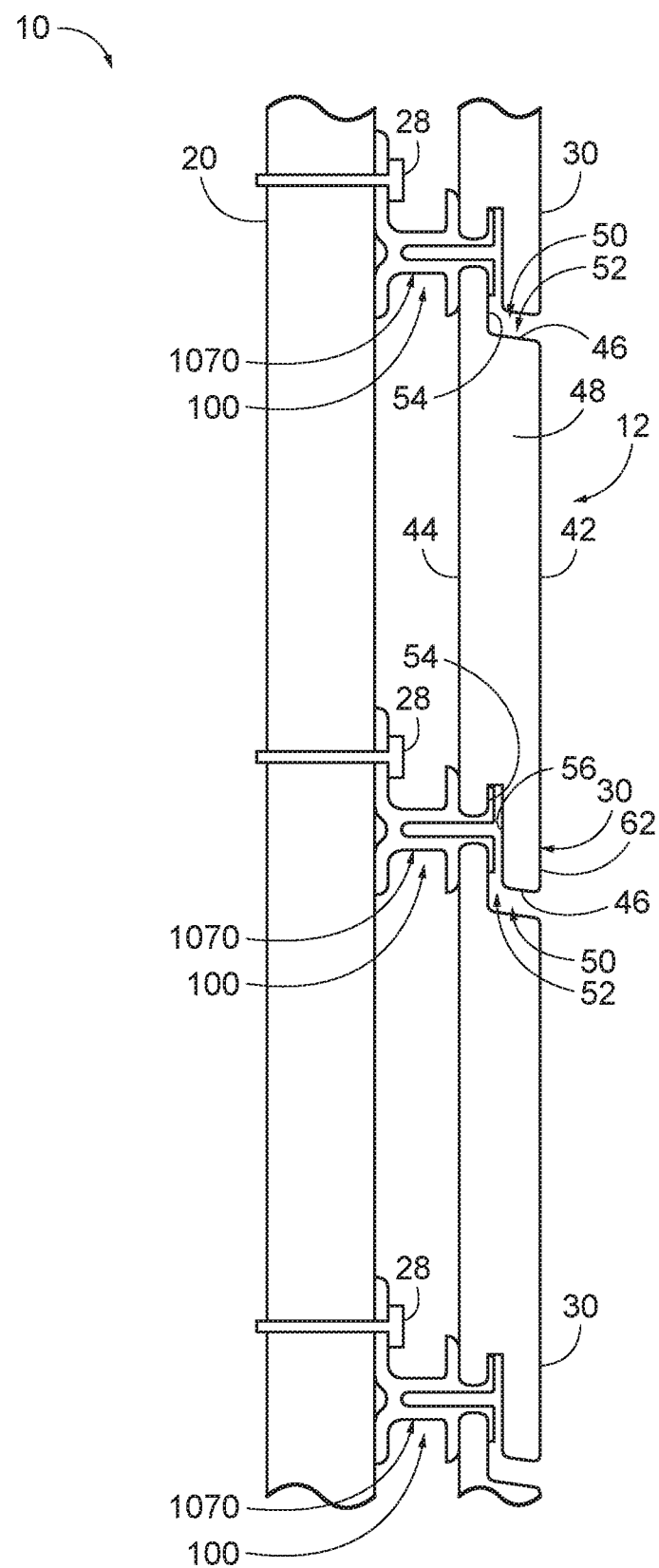
FIG. 19 is a side elevation view illustrating a portion of a panel mount system that includes the resilient mounting clip of FIGS. 17-18, according to the present disclosure.

FIGS. 17-18 illustrate a resilient mounting clip 1070, which is an example of resilient mounting clip 100. As illustrated in FIGS. 17-18, resilient mounting clip 1070 includes a pair of standoff members 118 that operatively couple connecting member 124 to each of a pair of inboard panel supports 122. Connecting member 124 defines three fastener apertures 112 (illustrated in FIG. 18) positioned exterior the pair of standoff members 118. FIG. 19 illustrates a portion of panel mount system 10 in which each of three resilient mounting clips 1070 is operatively coupled to a vertical support structure 20 by a respective fastener 28. Each resilient mounting clip 1070 receives a pair of panels 30 such that the resilient mounting clip is substantially concealed by joint overhang 62 of one of the pair of panels. FIG. 19 may be described as illustrating a portion of panel mount system 10 in which panels 30 collectively form structural surface 12 in the form of a rain screen.

Figure 20:
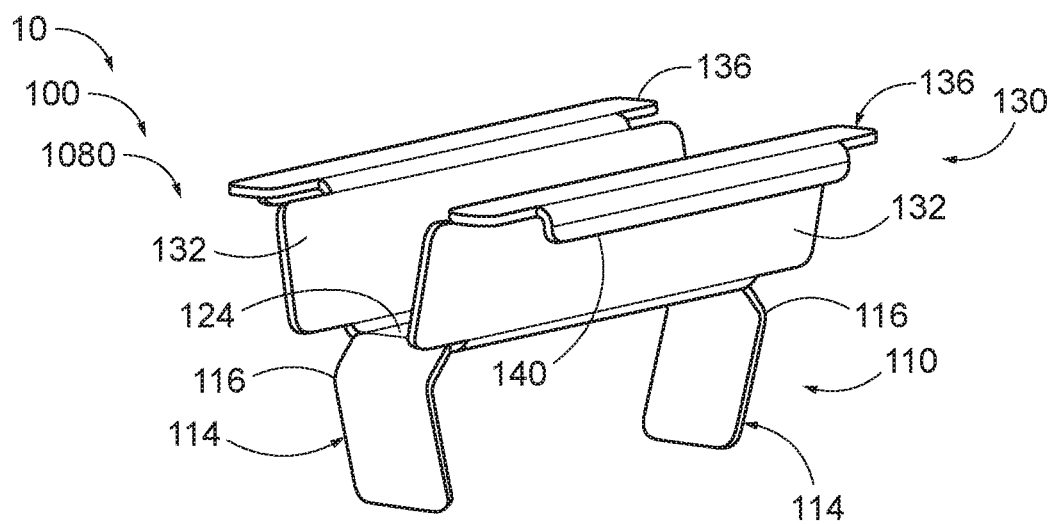
FIG. 20 is a top side isometric view illustrating another example of a resilient mounting clip according to the present disclosure.
Figure 21:
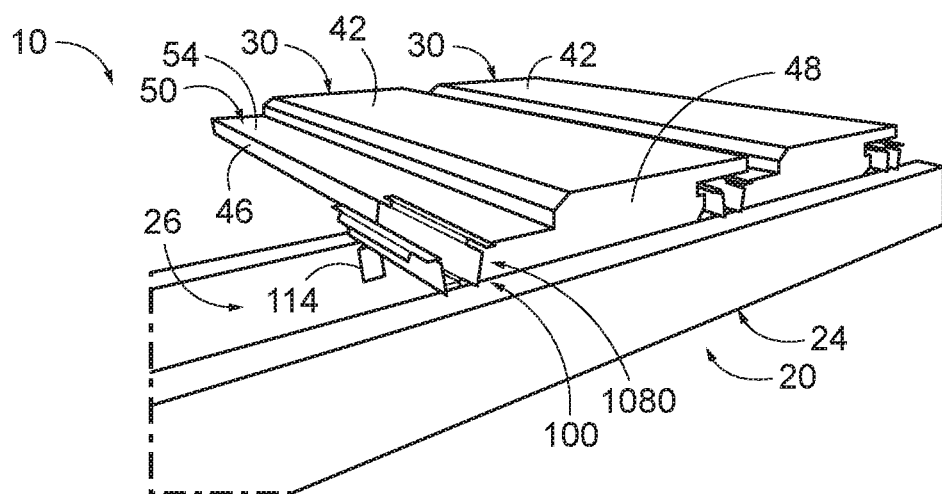
FIG. 21 is a fragmentary top side isometric view illustrating a portion of a partially assembled panel mount system that includes the resilient mounting clip of FIG. 20, according to the present disclosure.

FIG. 20 illustrates a resilient mounting clip 1080, which is an example of resilient mounting clip 100. As illustrated in FIG. 20, resilient mounting clip 1080 includes a pair of channel legs 114 extending from connecting member 124. Each channel leg 114 includes channel knee 116. Additionally, each outboard panel support 136 includes lip 140 extending toward support structure engagement portion 110. FIG. 21 illustrates a partially assembled panel mount system 10 in which resilient mounting clip 1080 is operatively coupled to an installation rail 24.

Figure 22:
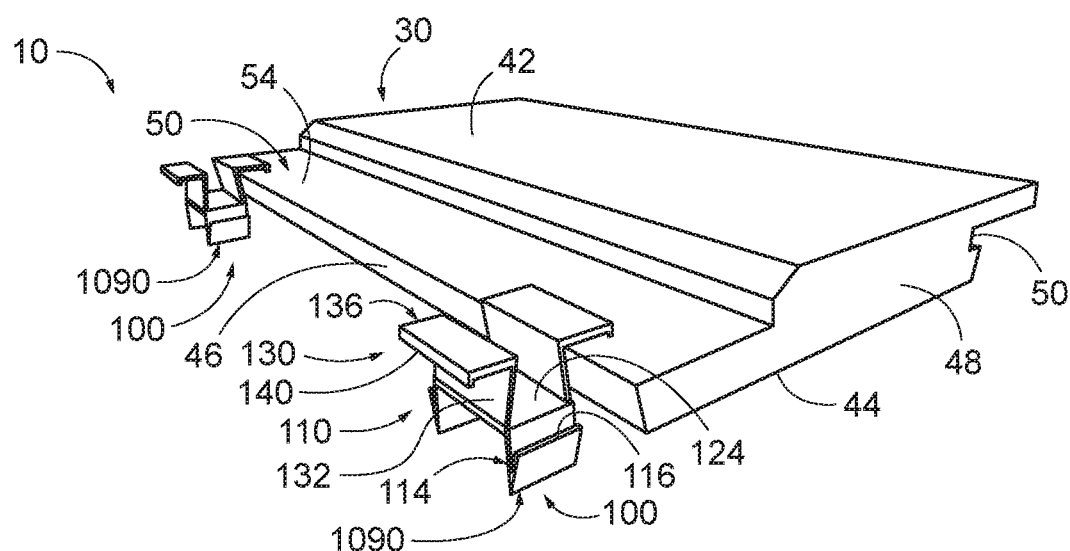
FIG. 22 is a top side isometric view illustrating a portion of a partially assembled panel mount system that includes another example of a resilient mounting clip according to the present disclosure.

FIG. 22 illustrates an example of a portion of panel mount system 10 that includes a resilient mounting clip 1090, which is an example of resilient mounting clip 100. As illustrated in FIG. 22, resilient mounting clip 1090 includes a pair of channel legs 114 with a corresponding pair of channel knees 116. In the embodiment of FIG. 22, each channel leg 114 is configured to resiliently flex to permit the resilient mounting clip to be inserted into channel 26 of an installation rail 24 (not illustrated in FIG. 22), and further is configured to restrict the resilient mounting clip from being removed from the channel unless each channel leg is manually flexed inward by a user.

Figure 23:
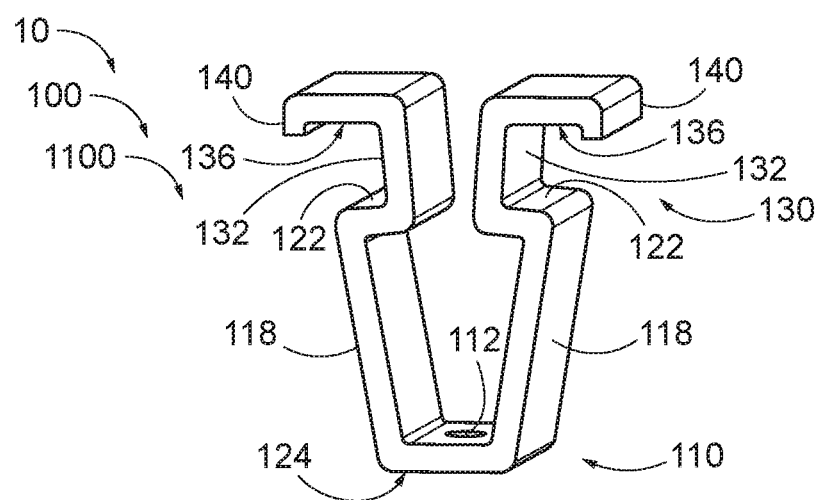
FIG. 23 is a top side isometric view illustrating another example of a resilient mounting clip according to the present disclosure.

FIG. 23 illustrates a resilient mounting clip 1100, which is an example of resilient mounting clip 100. As illustrated in FIG. 23, resilient mounting clip 1100 includes a pair of standoff members 118 that operatively couple connecting member 124 to each of a pair of inboard panel supports 122. The connecting member defines fastener aperture 112 between the pair of standoff members. Additionally, each outboard panel support 136 includes lip 140 extending toward support structure engagement portion 110.

Figure 24:
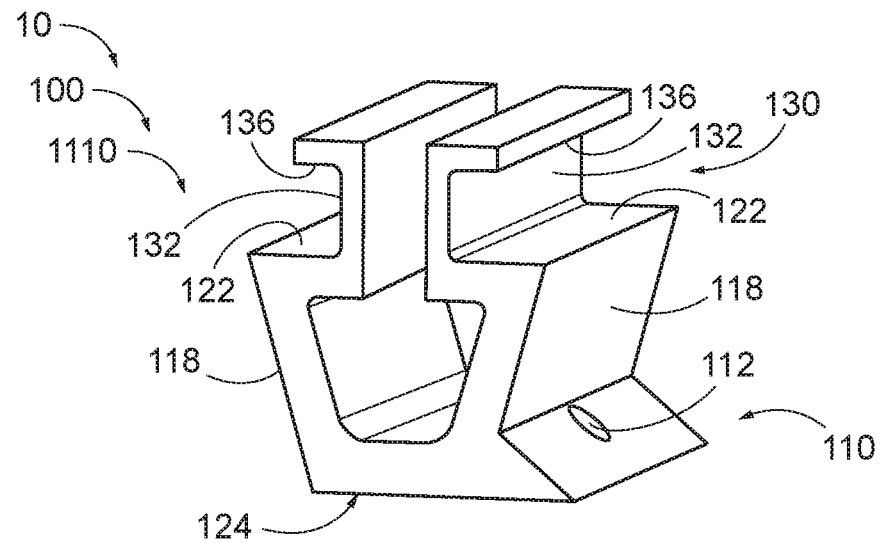
FIG. 24 is a top side isometric view illustrating another example of a resilient mounting clip according to the present disclosure.

FIG. 24 illustrates a resilient mounting clip 1110, which is an example of resilient mounting clip 100. As illustrated in FIG. 24, resilient mounting clip 1110 includes a pair of standoff members 118 that operatively couple connecting member 124 to each of a pair of inboard panel supports 122. In the embodiment of FIG. 24, the connecting member defines fastener aperture 112 on an exterior surface of support structure engagement portion 110.

Figure 25:
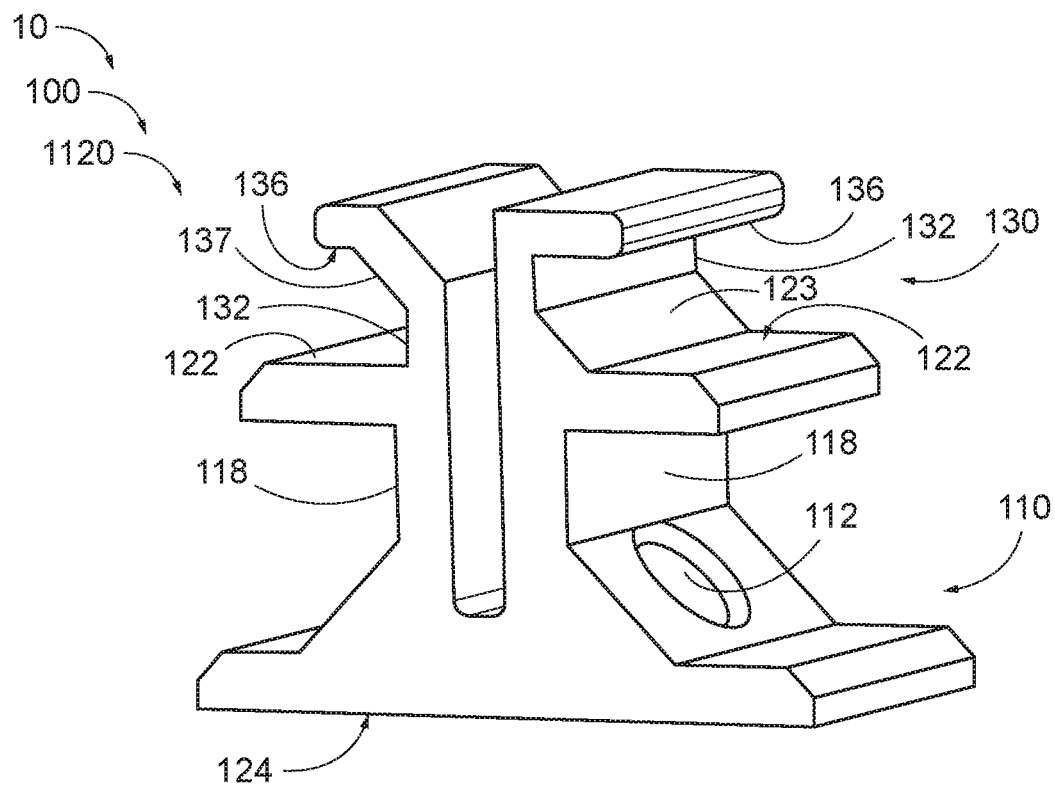
FIG. 25 is a top side isometric view illustrating another example of a resilient mounting clip according to the present disclosure.

FIG. 25 illustrates a resilient mounting clip 1120, which is an example of resilient mounting clip 100. As illustrated in FIG. 25, resilient mounting clip 1120 includes a pair of standoff members 118 that operatively couple connecting member 124 to each of a pair of inboard panel supports 122. Each standoff member is substantially coextensive with a corresponding edge extension 132. Connecting member 124 defines fastener aperture 112 on an exterior surface of support structure engagement portion 110. In the embodiment of FIG. 25, one inboard panel support 122 includes inboard panel support transition region 123 in the form of a chamfered surface, and one outboard panel support 136 includes outboard panel support transition region 137 in the form of a chamfered surface.

Figure 26:
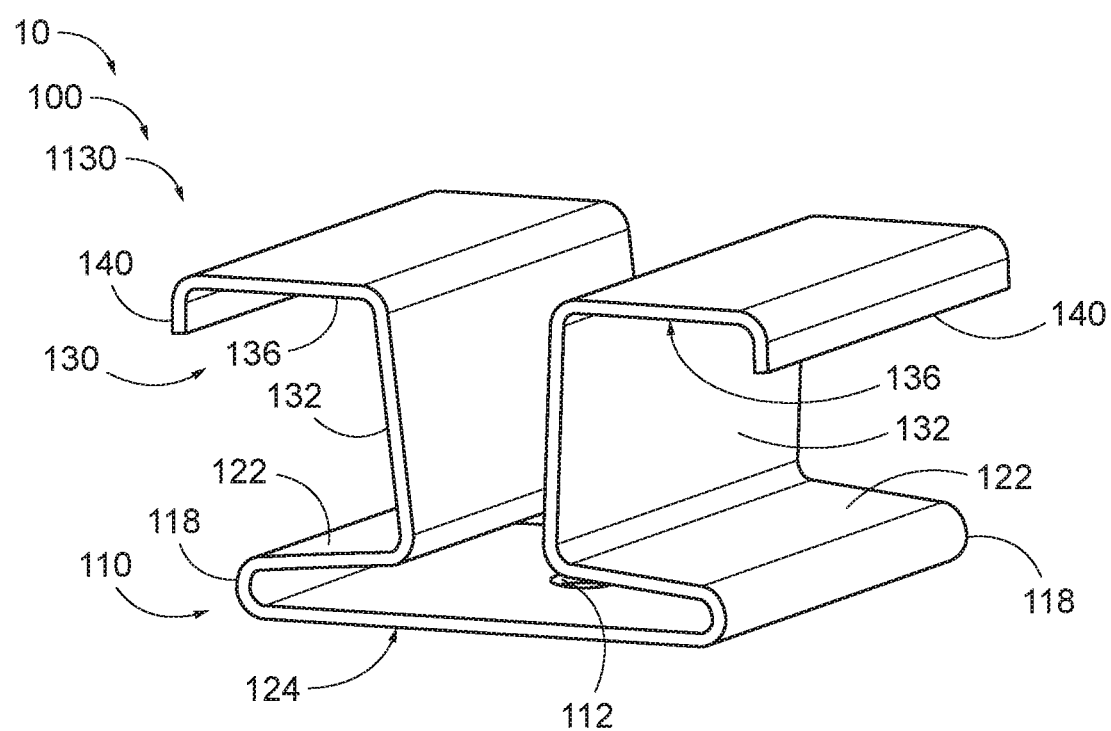
FIG. 26 is a top side isometric view illustrating another example of a resilient mounting clip according to the present disclosure.

FIG. 26 illustrates a resilient mounting clip 1130, which is an example of resilient mounting clip 100. As illustrated in FIG. 26, resilient mounting clip 1130 includes a pair of standoff members 118 that operatively couple connecting member 124 to each of a pair of inboard panel supports 122. The connecting member defines fastener aperture 112 between the pair of standoff members. Additionally, each outboard panel support 136 includes lip 140 extending toward support structure engagement portion 110.

Figure 27:
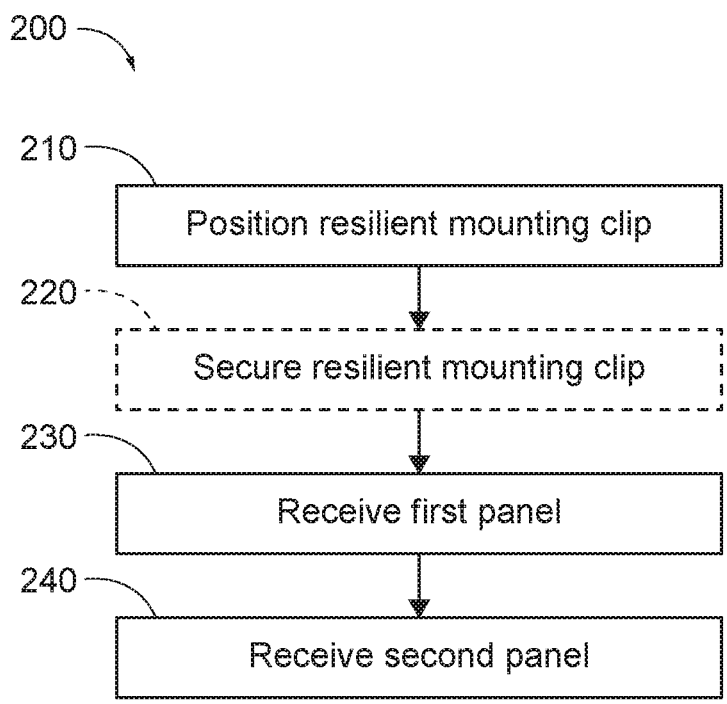
FIG. 27 is a flowchart depicting examples of methods of assembling panel mount systems according to the present disclosure.

FIG. 27 is a flowchart depicting methods 200, according to the present disclosure, of assembling a panel mount system (such as panel mount system 10) to form a structural surface (such as structural surface 12). Methods 200 include positioning, at 210, a resilient mounting clip (such as resilient mounting clip 100) of the panel mount system on a support structure (such as support structure 20) of the panel mount system. Methods 200 additionally may include securing, at 220, the resilient mounting clip to the support structure. Methods 200 further include receiving, at 230, a first panel (such as panel 30) in a first panel engagement portion (such as panel engagement portion 130) of the resilient mounting clip and receiving, at 240, a second panel (such as an additional panel 30) in a second panel engagement portion (such as an additional panel engagement portion 130) of the resilient mounting clip.

The securing at 220, the receiving at 230, and the receiving at 240 may be performed in any appropriate order. For example, the securing at 220 may be performed prior to the receiving at 230, may be performed subsequent to the receiving at 230, and/or may be performed subsequent to the receiving at 240. As a more specific example, in an embodiment of the panel mount system in which the resilient mounting clip includes a plurality of channel legs (such as channel legs 114) configured to be received by a channel (such as channel 26) of the support structure, the positioning at 210 may include inserting the channel legs into the channel such that the resilient mounting clip may translate along the channel. In such an embodiment, the securing at 220 may include fixing a position of the resilient mounting clip relative to the support structure with a fastener (such as fastener 28). In such an embodiment, the securing at 220 may be performed subsequent to the receiving the first panel at 230 and/or the receiving the second panel at 240.

Methods 200 additionally may include repeating the positioning at 210, the securing at 220, the receiving at 230, and/or the receiving at 240 as appropriate to complete assembly of the panel mount system. For example, the support structure may be a first support structure, the resilient mounting clip may be a first resilient mounting clip, and the panel mount system further may include a second support structure and a second resilient mounting clip. In such an embodiment, the positioning at 210 further may include positioning the second resilient mounting clip along the second support structure; the securing at 220 may include securing the second resilient mounting clip to the second support structure; the receiving at 230 may include receiving the first panel in a first panel engagement portion of the second resilient mounting clip; and/or the receiving at 240 may include receiving the second panel in a second panel engagement portion of the second resilient mounting clip. As another example, the panel mount system may include a plurality of panels that includes the first panel and the second panel, and the resilient mounting clip may be a first resilient mounting clip of a plurality of resilient mounting clips, such that each pair of adjacent panels of the assembled panel mount system includes at least one resilient mounting clip positioned therebetween. In such an example, the repeating the securing at 220 may include securing some, but not all, of the resilient mounting clips to the support structure. For example, the repeating the securing at 220 may include securing every second resilient mounting clip to the support structure, securing every third resilient mounting clip to the support structure, etc. Additionally or alternatively, the repeating the securing at 220 may include securing at least one resilient mounting clip to the support structure subsequent to each panel of the plurality of panels being operatively coupled to the support structure (via the receiving at 230 and/or the receiving at 240).

Examples of resilient mounting clips, panel mount systems, and associated methods according to the present disclosure are described in the following enumerated paragraphs:

A1. A resilient mounting clip for mounting a pair of panels relative to a support structure, the resilient mounting clip comprising:
  a support structure engagement portion configured to be selectively installed on the support structure; and
  a panel engagement portion operatively coupled to the support structure engagement portion and configured to receive each panel of the pair of panels;
  wherein the panel engagement portion comprises:
  a plurality of edge extensions;
  a plurality of outboard panel supports, each outboard panel support extending from a respective edge extension of the plurality of edge extensions and configured to at least partially retain a respective panel of the pair of panels in position with respect to the support structure; and
  a plurality of panel contact locations, each panel contact location configured to engage at least a portion of a respective longitudinal edge of the respective panel of the pair of panels, wherein each panel contact location is defined by at least one of an edge extension of the plurality of edge extensions and an outboard panel support of the plurality of outboard panel supports; and
  wherein each edge extension is configured to resiliently flex with respect to at least a portion of the support structure engagement portion responsive to the respective longitudinal edges of the pair of panels moving toward and away from one another.

A2. The resilient mounting clip of paragraph A1, wherein each outboard panel support is configured to move along a direction that is at least substantially parallel to a compression axis when the respective edge extension resiliently flexes with respect to the support structure engagement portion.

A3. The resilient mounting clip of any of paragraphs A1-A2, wherein the resilient mounting clip defines a clip plane, wherein each outboard panel support is configured to move along a direction that is at least substantially parallel to a compression axis, which is at least substantially parallel to the clip plane, when the respective edge extension resiliently flexes with respect to the support structure engagement portion.

A4. The resilient mounting clip of any of paragraphs A1-A3, wherein the plurality of edge extensions includes one of two edge extensions, three edge extensions, four edge extensions, and more than four edge extensions.

A5. The resilient mounting clip of any of paragraphs A1-A4, wherein each edge extension is configured to transition between a nominal position with respect to the support structure engagement portion and at least one flexed position with respect to the support structure engagement portion, and wherein the resilient mounting clip is configured to resiliently bias each edge extension toward the nominal position when each edge extension is in the flexed position.

A6. The resilient mounting clip of paragraph A5, wherein the panel engagement portion has a nominal edge spacing, as measured between the respective panel contact locations of a pair of edge extensions of the plurality of edge extensions that are configured to engage distinct respective panels and along a direction parallel to the compression axis when each edge extension is in the nominal position; and wherein the nominal edge spacing is at least one of at least 3 millimeters (mm) (0.12 inches (in)), at least 10 mm (0.39 in), at least 20 mm (0.79 in), at least 30 mm (1.18 in), at least 40 mm (1.57 in), at least 50 mm (1.97 in), at least 60 mm (2.36 in), at least 70 mm (2.76 in), at most 75 mm (2.95 in), at most 65 mm (2.56 in), at most 55 mm (2.17 in), at most 45 mm (1.77 in), at most 35 mm (1.38 in), at most 25 mm (0.98 in), at most 15 mm (0.59 in), and at most 5 mm (0.20 in).

A7. The resilient mounting clip of paragraph A6, wherein the panel engagement portion has a compressed edge spacing, as measured between the respective panel contact locations of a pair of edge extensions of the plurality of edge extensions that are configured to engage distinct respective panels and along a direction parallel to the compression axis when each edge extension is in the flexed position; and wherein the compressed edge spacing is at least one of at least 1 mm (0.04 in), at least 3 mm (0.12 in), at least 10 mm (0.39 in), at least 20 mm (0.79 in), at least 30 mm (1.18 in), at least 40 mm (1.57 in), at least 50 mm (1.97 in), at least 60 mm (2.36 in), at most 65 mm (2.56 in), at most 55 mm (2.17 in), at most 45 mm (1.77 in), at most 35 mm (1.38 in), at most 25 mm (0.98 in), at most 15 mm (0.59 in), at most 5 mm (0.20 in), and at most 2 mm (0.08 in).

A8. The resilient mounting clip of any of paragraphs A1-A7, wherein each edge extension is configured to flex with respect to at least a portion of the support structure engagement portion with an elastic modulus that is at least one of at least 1 Megapascal (MPa) (145 pounds per square inch (psi)), at least 3 MPa (435 psi), at least 5 MPa (725 psi), at least 10 MPa (1450 psi), at least 30 MPa (4351 psi), at least 50 MPa (7251 psi), at least 100 MPa (14504 psi), at most 120 MPa (17404 psi), at most 70 MPa (10153 psi), at most 20 MPa (2901 psi), at most 7 MPa (1015 psi), and at most 2 MPa (290 psi).

A9. The resilient mounting clip of any of paragraphs A1-A8, wherein each outboard panel support includes at least one lip, and wherein each lip extends at least one of toward the support structure engagement portion and away from the support structure engagement portion.

A10. The resilient mounting clip of paragraph A9, wherein at least one lip is configured to positively engage the respective panel of the pair of panels to restrict the panel from moving with respect to the panel engagement portion.

A11. The resilient mounting clip of any of paragraphs A9-A10, wherein at least one lip is configured to facilitate receiving the respective panel with the panel engagement portion.

A12. The resilient mounting clip of any of paragraphs A1-A11, wherein at least one outboard panel support includes an elbow projection that extends, and optionally curves, away from the support structure engagement portion relative to the corresponding edge extension that extends from the outboard panel support.

A13. The resilient mounting clip of paragraph A12, wherein the corresponding edge extension extends from the elbow projection.

A14. The resilient mounting clip of any of paragraphs A12-A13, wherein the elbow projection is configured to positively engage the respective panel to restrict the respective panel from moving with respect to the panel engagement portion.

A15. The resilient mounting clip of any of paragraphs A12-A14, wherein the elbow projection is configured to facilitate flexing of the corresponding edge extension with respect to the outboard panel support responsive to a force exerted on the edge extension by the respective panel.

A16. The resilient mounting clip of any of paragraphs A1-A15, wherein each edge extension is at least substantially curved between the support structure engagement portion and the panel engagement portion.

A17. The resilient mounting clip of any of paragraphs A1-A16, wherein at least one edge extension of the plurality of edge extensions includes an edge extension cutout defined by and/or within the corresponding edge extension.

A18. The resilient mounting clip of paragraph A17, wherein the edge extension includes one or more of a recess, an indentation, a void, a hole, and an aperture defined by and/or within the corresponding edge extension.

A19. The resilient mounting clip of any of paragraphs A17-A18, wherein the edge extension cutout is configured to reduce an elastic modulus of the corresponding edge extension in a region adjacent to the edge extension cutout relative to an otherwise identical edge extension that lacks the edge extension cutout.

A20. The resilient mounting clip of any of paragraphs A17-A19, wherein the edge extension cutout is configured to at least partially localize a flexure of the corresponding edge extension to a/the region adjacent to the edge extension cutout when the corresponding edge extension is flexed away from a/the nominal position.

A21. The resilient mounting clip of any of paragraphs A1-A20, wherein at least one outboard panel support is configured to contact an exterior joint face of the respective panel when the panel engagement portion receives the respective panel, wherein the exterior joint face faces away from the support structure when the resilient mounting clip is installed on the support structure and when the panel engagement portion receives the respective panel.

A22. The resilient mounting clip of any of paragraphs A1-A21, wherein at least one outboard panel support is configured to contact an interior joint face of the respective panel when the panel engagement portion receives the respective panel, wherein the interior joint face faces toward the support structure when the resilient mounting clip is installed on the support structure and when the panel engagement portion receives the respective panel.

A23. The resilient mounting clip of any of paragraphs A3-A22, wherein each edge extension has an edge extension depth, as measured in a direction perpendicular to the clip plane, and wherein the edge extension depth is at least one of at least 3 mm (0.12 in), at least 10 mm (0.39 in), at least 20 mm (0.79 in), at least 30 mm (1.18 in), at least 40 mm (1.57 in), at least 50 mm (1.97 in), at least 60 mm (2.36 in), at least 70 mm (2.76 in), at most 75 mm (2.95 in), at most 65 mm (2.56 in), at most 55 mm (2.17 in), at most 45 mm (1.77 in), at most 35 mm (1.38 in), at most 25 mm (0.98 in), at most 15 mm (0.59 in), and at most 5 mm (0.20 in).

A24. The resilient mounting clip of paragraph A23, wherein the edge extension depth is at least substantially equal to a thickness of a portion of the respective panel that is received by the panel engagement portion.

A25. The resilient mounting clip of any of paragraphs A3-A24, wherein each edge extension has a cant angle, as measured between the edge extension and a direction perpendicular to the clip plane, and wherein the cant angle is at least one of 0 degrees, at least 0 degrees, at least 10 degrees, at least 20 degrees, at least 30 degrees, at least 40 degrees, at most 45 degrees, at most 35 degrees, at most 25 degrees, at most 15 degrees, and at most 5 degrees.

A26. The resilient mounting clip of paragraph A25, wherein at least one edge extension is angled generally toward a direction in which a respective outboard panel support extends from the edge extension by the cant angle.

A27. The resilient mounting clip of any of paragraphs A25-A26, wherein at least one edge extension is angled generally away from a direction in which a respective outboard panel support extends from the edge extension by the cant angle.

A28. The resilient mounting clip of any of paragraphs A1-A27, wherein each outboard panel support has an outboard panel support length, as measured in a direction parallel to the compression axis, and wherein the outboard panel support length is at least one of at least 3 mm (0.12 in), at least 10 mm (0.39 in), at least 20 mm (0.79 in), at least 30 mm (1.18 in), at least 40 mm (1.57 in), at least 50 mm (1.97 in), at least 60 mm (2.36 in), at least 70 mm (2.76 in), at most 75 mm (2.95 in), at most 65 mm (2.56 in), at most 55 mm (2.17 in), at most 45 mm (1.77 in), at most 35 mm (1.38 in), at most 25 mm (0.98 in), at most 15 mm (0.59 in), and at most 5 mm (0.20 in).

A29. The resilient mounting clip of paragraph A28, wherein the outboard panel support length is measured along a surface of the outboard panel support distal the support structure engagement portion.

A30. The resilient mounting clip of any of paragraphs A1-A29, wherein the outboard panel support includes an outboard panel support transition region extending between a respective edge extension and a remainder of the outboard panel support.

A31. The resilient mounting clip of paragraph A30, wherein the outboard panel support transition region includes at least one of a curved surface and a chamfered surface.

A32. The resilient mounting clip of any of paragraphs A30-A31, wherein the outboard panel support transition region extends at least substantially oblique to the respective edge extension.

A33. The resilient mounting clip of any of paragraphs A30-A32, wherein the outboard panel support transition region includes at least a portion of the panel contact location of the respective edge extension.

A34. The resilient mounting clip of any of paragraphs A1-A33, wherein the support structure engagement portion includes a connecting member that operatively couples the plurality of edge extensions to one another, wherein each edge extension is configured to resiliently flex with respect to the connecting member.

A35. The resilient mounting clip of paragraph A34, wherein each edge extension extends from the connecting member.

A36. The resilient mounting clip of any of paragraphs A1-A35, wherein the support structure engagement portion includes at least one inboard panel support configured to engage a panel interior face of a respective panel of the pair of panels, wherein the panel interior face faces toward the support structure when the respective panel is operatively received by the resilient mounting clip and when the resilient mounting clip is operatively coupled to the support structure.

A37. The resilient mounting clip of paragraph A36, wherein each inboard panel support extends at least substantially parallel to each outboard panel support.

A38. The resilient mounting clip of any of paragraphs A36-A37, when dependent from paragraph A34, wherein the connecting member extends at least substantially parallel to each inboard panel support.

A39. The resilient mounting clip of any of paragraphs A36-A38, wherein each edge extension extends from a corresponding inboard panel support of the at least one inboard panel support.

A40. The resilient mounting clip of paragraph A39, wherein each edge extension is configured to resiliently flex with respect to the corresponding inboard panel support.

A41. The resilient mounting clip of any of paragraphs A36-A40, when dependent from paragraph A34, wherein the connecting member includes each inboard panel support.

A42. The resilient mounting clip of any of paragraphs A36-A41, wherein the inboard panel support includes an inboard panel support transition region extending between a respective edge extension and a remainder of the inboard panel support.

A43. The resilient mounting clip of paragraph A42, wherein the inboard panel support transition region includes at least one of a curved surface and a chamfered surface.

A44. The resilient mounting clip of any of paragraphs A42-A43, wherein the inboard panel support transition region extends at least substantially oblique to the respective edge extension.

A45. The resilient mounting clip of any of paragraphs A42-A44, wherein the inboard panel support transition region includes at least a portion of the panel contact location of the respective edge extension.

A46. The resilient mounting clip of any of paragraphs A36-A45, when dependent from paragraph A34, wherein the support structure engagement portion includes at least one standoff member extending from the connecting member, wherein each standoff member operatively couples the connecting member to a respective inboard panel support.

A47. The resilient mounting clip of paragraph A46, wherein each standoff member is configured to resiliently flex with respect to the connecting member.

A48. The resilient mounting clip of any of paragraphs A46-A47, when dependent from paragraphs A3 and A36, wherein each standoff member maintains the respective inboard panel support in a spaced-apart position with respect to the connecting member such that the respective inboard panel support is spaced apart from the connecting member by a standoff distance, as measured in a direction perpendicular to the clip plane.

A49. The resilient mounting clip of paragraph A48, wherein the standoff distance is at least one of at least 3 mm (0.12 in), at least 10 mm (0.39 in), at least 20 mm (0.79 in), at least 30 mm (1.18 in), at least 40 mm (1.57 in), at least 50 mm (1.97 in), at least 60 mm (2.36 in), at least 70 mm (2.76 in), at most 75 mm (2.95 in), at most 65 mm (2.56 in), at most 55 mm (2.17 in), at most 45 mm (1.77 in), at most 35 mm (1.38 in), at most 25 mm (0.98 in), at most 15 mm (0.59 in), and at most 5 mm (0.20 in).

A50. The resilient mounting clip of any of paragraphs A36-A49, when dependent from paragraph A3, wherein each outboard panel support is misaligned with each inboard panel support as viewed along a direction perpendicular to the clip plane.

A51. The resilient mounting clip of any of paragraphs A1-A50, wherein each edge extension is configured to engage a respective panel of the pair of panels that is different than the panel that is engaged by the outboard panel support that extends from the edge extension when each edge extension is in a/the nominal position.

A52. The resilient mounting clip of any of paragraphs A1-A51, wherein the support structure engagement portion includes at least one fastener aperture configured to receive a fastener to operatively couple the resilient mounting clip to the support structure.

A53. The resilient mounting clip of paragraph A52, wherein the fastener includes at least one of a nail, a screw, a tack, and a bolt.

A54. The resilient mounting clip of any of paragraphs A52-A53, when dependent from paragraph A34, wherein the connecting member defines at least one fastener aperture.

A55. The resilient mounting clip of any of paragraphs A52-A54, when dependent from paragraph A36, wherein at least one inboard panel support defines at least one fastener aperture.

A56. The resilient mounting clip of any of paragraphs A52-A55, when dependent from paragraph A3, wherein at least one fastener aperture extends along a direction that is at least substantially perpendicular to the clip plane.

A57. The resilient mounting clip of any of paragraphs A52-A56, when dependent from paragraph A3, wherein at least one fastener aperture extends along a direction that is oblique to the clip plane.

A58. The resilient mounting clip of any of paragraphs A52-A57, wherein each fastener aperture is at least substantially aligned with each edge extension.

A59. The resilient mounting clip of any of paragraphs A52-A58, wherein the at least one fastener aperture includes one of one fastener aperture, two fastener apertures, three fastener apertures, and more than three fastener apertures.

A60. The resilient mounting clip of any of paragraphs A1-A59, wherein the support structure includes, and optionally is, an installation rail that defines a channel, wherein the support structure engagement portion includes at least one channel leg extending away from the panel engaged portion, and wherein each channel leg is configured to be selectively received within the channel of the installation rail to operatively couple the resilient mounting clip to the installation rail.

A61. The resilient mounting clip of paragraph A60, when dependent from paragraph A34, wherein each channel leg extends from the connecting member.

A62. The resilient mounting clip of any of paragraphs A60-A61, wherein each channel leg includes a channel knee configured to restrict the channel leg from being removed from the channel.

A63. The resilient mounting clip of any of paragraphs A60-A62, wherein each channel leg is configured to resiliently flex with respect to the panel engagement portion to enable each channel leg to be selectively inserted into and removed from the channel.

A64. The resilient mounting clip of any of paragraphs A60-A63, wherein the channel has a minimum channel width, as measured in a direction perpendicular to a length of the installation rail; wherein the support structure engagement portion has two channel legs with respective channel knees; wherein the support structure engagement portion has a nominal knee separation, as measured between the respective channel knees; and wherein the nominal knee separation is greater than the minimum channel width.

A65. The resilient mounting clip of paragraph A64, wherein each channel leg is configured to resiliently flex with respect to the panel engagement portion such that a distance between the two channel knees is at most equal to the minimum channel width.

A66. The resilient mounting clip of any of paragraphs A60-A65, wherein each channel leg is configured to frictionally engage the installation rail when each channel leg is received within the channel to restrict the resilient mounting clip from translating along the channel when the resilient mounting clip is operatively coupled to the installation rail.

A67. The resilient mounting clip of any of paragraphs A3-A66, wherein the resilient mounting clip has a clip length, as measured in a direction parallel to the clip plane and perpendicular to the compression axis, and wherein the clip length is at least one of at least 10 mm (0.39 in), at least 20 mm (0.79 in), at least 30 mm (1.18 in), at least 40 mm (1.57 in), at least 50 mm (1.97 in), at least 60 mm (2.36 in), at least 70 mm (2.76 in), at least 80 mm (3.15 in), at least 90 mm (3.54 in), at least 100 mm (3.94 in), at least 150 mm (5.91 in), at most 200 mm (7.87 in), at most 175 mm (6.89 in), at most 125 mm (4.92 in), at most 95 mm (3.74 in), at most 85 mm (3.35 in), at most 75 mm (2.95 in), at most 65 mm (2.56 in), at most 55 mm (2.17 in), at most 45 mm (1.77 in), at most 35 mm (1.38 in), at most 25 mm (0.98 in), and at most 15 mm (0.59 in).

A68. The resilient mounting clip of any of paragraphs A1-A67, wherein the resilient mounting clip is formed of at least one of a metal, an electroplated metal, steel, galvanized steel, spring steel, carbon steel, 1050 carbon steel, aluminum, extruded aluminum, a plastic, a thermoplastic, a polymer, an injection-molded polymer, a resin, and an acetal.

A69. The resilient mounting clip of any of paragraphs A1-A68, wherein the resilient mounting clip is formed from a sheet material with a thickness that is one of thicker than 16 gauge, 16 gauge, 18 gauge, 20 gauge, and thinner than 20 gauge.

B1. A panel mount system for mounting a plurality of panels to form a structural surface, the panel mount system comprising:
at least one support structure;
at least one resilient mounting clip operatively coupled to the support structure; and
at least two panels received by each resilient mounting clip;
wherein each resilient mounting clip is the resilient mounting clip of any of paragraphs A1-A69.

B2. The panel mount system of paragraph B1, wherein the structural surface includes, and optionally is, at least one of a rain screen, a curtain wall, a façade, an exterior siding, and a deck.

B3. The panel mount system of any of paragraphs B1-B2, wherein the support structure includes at least one joist, and wherein each resilient mounting clip is operatively coupled to the joist by a/the fastener.

B4. The panel mount system of paragraph B3, wherein the joist includes, and optionally is, at least one of a floor joist, a ceiling joist, a wall joist, a binding joist, and a bridging joist.

B5. The panel mount system of any of paragraphs B1-B4, wherein the support structure includes a/the at least one installation rail with a/the corresponding channel, and wherein each resilient mounting clip is at least partially received within the channel to operatively couple the resilient mounting clip to the installation rail.

B6. The panel mount system of any of paragraphs B1-B5, wherein each panel includes a/the panel interior face, and wherein the panel interior face of each panel is spaced apart from the support structure by at least a/the standoff distance.

B7. The panel mount system of any of paragraphs B1-B6, wherein each panel is at least substantially rectangular.

B8. The panel mount system of any of paragraphs B1-B7, wherein each panel has a pair of longitudinal edges and a pair of lateral edges.

B9. The panel mount system of paragraph B8, wherein each lateral edge is perpendicular to each longitudinal edge.

B10. The panel mount system of any of paragraphs B8-B9, wherein each longitudinal edge is longer than each lateral edge.

B11. The panel mount system of any of paragraphs B8-B10, wherein each panel extends along a panel plane, and wherein each longitudinal edge extends in a direction that is parallel to a longitudinal axis of the panel that is at least substantially parallel to the panel plane.

B12. The panel mount system of paragraph B11, wherein each support structure extends at least substantially perpendicular to the longitudinal axis of each panel.

B13. The panel mount system of any of paragraphs B11-B12, wherein the longitudinal axis of each panel is at least substantially parallel to a ground surface when the panel is operatively received by the resilient mounting clip and when the resilient mounting clip is operatively coupled to the support structure.

B14. The panel mount system of any of paragraphs B11-B12, wherein the longitudinal axis of each panel is at least substantially oblique to the ground surface when the panel is operatively received by the resilient mounting clip and when the resilient mounting clip is operatively coupled to the support structure.

B15. The panel mount system of any of paragraphs B11-B12, wherein the longitudinal axis of each panel is at least substantially perpendicular to the ground surface when the panel is operatively received by the resilient mounting clip and when the resilient mounting clip is operatively coupled to the support structure.

B16. The panel mount system of any of paragraphs B8-B15, wherein each panel extends along a/the panel plane, and wherein each lateral edge extends in a direction that is parallel to a lateral axis of the panel that is at least substantially parallel to the panel plane.

B17. The panel mount system of paragraph B16, wherein the lateral axis of the panel is at least substantially perpendicular to a/the longitudinal axis of the panel.

B18. The panel mount system of any of paragraphs B16-B17, wherein the lateral axis of each panel is at least substantially parallel to a/the ground surface when the panel is operatively received by the resilient mounting clip and when the resilient mounting clip is operatively coupled to the support structure.

B19. The panel mount system of any of paragraphs B16-B17, wherein the lateral axis of each panel is at least substantially oblique to a/the ground surface when the panel is operatively received by the resilient mounting clip and when the resilient mounting clip is operatively coupled to the support structure.

B20. The panel mount system of any of paragraphs B16-B17, wherein the lateral axis of each panel is at least substantially perpendicular to a/the ground surface when the panel is operatively received by the resilient mounting clip and when the resilient mounting clip is operatively coupled to the support structure.

B21. The panel mount system of any of paragraphs B16-B20, wherein the lateral axis of each panel is at least substantially parallel to the compression axis of the resilient mounting clip when the panel is operatively received by the resilient mounting clip and when the resilient mounting clip is operatively coupled to the support structure.

B22. The panel mount system of any of paragraphs B8-B21, wherein each panel extends along a/the panel plane, wherein at least a portion of at least one longitudinal edge of each panel is beveled with a bevel angle, as measured between the longitudinal edge and a direction perpendicular to the panel plane, and wherein the bevel angle is at least one of at least 1 degree, at least 3 degrees, at least 5 degrees, at least 10 degrees, at least 20 degrees, at least 30 degrees, at least 40 degrees, at most 45 degrees, at most 35 degrees, at most 25 degrees, at most 15 degrees, at most 7 degrees, and at most 2 degrees.

B23. The panel mount system of any of paragraphs B1-B22, wherein each panel includes a panel exterior face that faces away from the support structure when the panel is operatively received by the resilient mounting clip, and wherein each panel exterior face partially defines the structural surface.

B24. The panel mount system of any of paragraphs B1-B23, wherein each panel is formed of a material that expands and/or contracts responsive to a change in at least one of an ambient humidity, an ambient moisture level, and an ambient temperature.

B25. The panel mount system of paragraph B24, when dependent from paragraph B11, wherein each panel is configured such that the panel expands and/or contracts along a direction that is at least substantially perpendicular to the longitudinal axis.

B26. The panel mount system of any of paragraphs B24-B25, wherein the panel mount system is configured such that each resilient mounting clip resiliently flexes responsive to the expansion and/or contraction of each panel that is received by the resilient mounting clip.

B27. The panel mount system of any of paragraphs B1-B26, wherein each panel is formed at least partially of wood, and optionally wherein each panel is formed at least partially of at least one of ipe, mahogany, batu mahogany, cumaru, cedar, redwood, pine, and a fiberboard.

B28. The panel mount system of paragraph B27, when dependent from paragraph B11, wherein each panel is configured such that a wood grain of the panel is at least substantially parallel to the longitudinal axis of the panel.

B29. The panel mount system of any of paragraphs B1-B28, wherein each panel is formed at least partially of at least one of a metal, a composite material, and a synthetic material.

B30. The panel mount system of any of paragraphs B1-B29, wherein each panel is an E4E panel that has four eased edges.

B31. The panel mount system of any of paragraphs B1-B30, wherein each panel is an S4S panel that has four surfaced sides.

B32. The panel mount system of any of paragraphs B1-B31, wherein each longitudinal edge of each panel includes a joint structure configured to engage at least one respective resilient mounting clip of the at least one resilient mounting clip.

B33. The panel mount system of paragraph B32, wherein the joint structure includes at least one of a lap joint, ship lap joint, a drop lap joint, a tongue and groove joint, a Dutch lap joint, a shadow gap joint, and a rabbet joint.

B34. The panel mount system of any of paragraphs B32-B33, wherein at least one joint structure includes an exterior joint face that extends at least substantially parallel to the panel exterior face, wherein the exterior joint face faces generally away from the support structure when the panel is operatively received by the resilient mounting clip and when the resilient mounting clip is operatively coupled to the support structure, and wherein the outboard panel support of a respective resilient mounting clip engages the exterior joint face when the panel is operatively received by the respective resilient mounting clip.

B35. The panel mount system of any of paragraphs B32-B34, wherein at least one joint structure includes an interior joint face that extends at least substantially parallel to the panel exterior face, wherein the interior joint face faces generally toward the support structure when the panel is operatively received by the resilient mounting clip and when the resilient mounting clip is operatively coupled to the support structure.

B36. The panel mount system of paragraph B35, wherein the outboard panel support of a/the respective resilient mounting clip engages the interior joint face when the panel is operatively received by the respective resilient mounting clip.

B37. The panel mount system of any of paragraphs B35-B36, when dependent from paragraph B33, wherein each panel extends along a/the panel plane, wherein the joint structure includes a shoulder that extends at least substantially perpendicular to the panel plane.

B38. The panel mount system of paragraph B37, wherein the shoulder extends between a/the exterior joint face and a/the interior joint face of the joint structure.

B39. The panel mount system of any of paragraphs B37-B38, wherein the outboard panel support of a/the respective resilient mounting clip engages the shoulder when the panel is operatively received by the resilient mounting clip.

B40. The panel mount system of any of paragraphs B37-B39, wherein the shoulder has a shoulder depth, as measured in a direction perpendicular a/the panel exterior face of the panel, and wherein the shoulder depth is at least one of at least 1 mm (0.04 in), at least 3 mm (0.12 in), at least 5 mm (0.20 in), at least 10 mm (0.39 in), at least 20 mm (0.79 in), at least 30 mm (1.18 in), at most 35 mm (1.38 in), at most 25 mm (0.98 in), at most 15 mm (0.59 in), at most 7 mm (0.28 in), and at most 2 mm (0.08 in).

B41. The panel mount system of any of paragraphs B37-B40, wherein the joint structure includes a cheek that extends away from the shoulder, wherein the cheek includes a/the exterior joint face.

B42. The panel mount system of paragraph B41, wherein the cheek has a cheek length, as measured in a direction parallel to a/the lateral axis of the panel and between the shoulder and a/the longitudinal edge of the panel, and wherein the cheek length is at least one of at least 5 mm (0.20 in), at least 10 mm (0.39 in), at least 20 mm (0.79 in), at least 30 mm (1.18 in), at least 40 mm (1.57 in), at most 45 mm (1.77 in), at most 35 mm (1.38 in), at most 25 mm (0.98 in), at most 15 mm (0.59 in), and at most 7 mm (0.28 in).

B43. The panel mount system of any of paragraphs B41-B42, wherein the cheek has a cheek depth, as measured in a direction perpendicular to the panel plane and between a/the panel interior face and the exterior joint face, and wherein the cheek depth is at least one of at least 5 mm (0.20 in), at least 10 mm (0.39 in), at least 15 mm (0.59 in), at least 20 mm (0.79 in), at least 25 mm (0.98 in), at most 30 mm (1.18 in), at most 27 mm (1.06 in), at most 22 mm (0.87 in), at most 17 mm (0.67 in), at most 12 mm (0.47 in), and at most 7 mm (0.28 in).

B44. The panel mount system of any of paragraphs B32-B43, wherein at least one joint structure includes a joint overhang that at least substantially conceals a/the respective resilient mounting clip from view when the panel is operatively received by the respective resilient mounting clip.

B45. The panel mount system of paragraph B44, wherein the joint overhang extends at least partially, and optionally fully, over a/the exterior joint face of the panel.

B46. The panel mount system of any of paragraphs B44-B45, wherein the joint overhang extends at least partially over a/the exterior joint face of an adjacent panel when each panel is operatively received by the resilient mounting clip.

B47. The panel mount system of any of paragraphs B1-B46, wherein each panel has a panel width, as measured in a direction parallel to a/the lateral axis of the panel, and wherein the panel width is at least one of at least 30 mm (1.18 in), at least 50 mm (1.97 in), at least 100 mm (3.94 in), at least 130 mm (5.12 in), at least 150 mm (5.91 in), at least 200 mm (7.87 in), at most 250 mm (9.84 in), at most 170 mm (6.69 in), at most 120 mm (4.72 in), and at most 70 mm (2.76 in).

B48. The panel mount system of any of paragraphs B1-B47, wherein each panel extends along a/the panel plane, wherein each panel has a panel thickness, as measured in a direction perpendicular to the panel plane and between a/the panel exterior face and a/the panel interior face, and wherein the panel thickness is at least one of at least 5 mm (0.20 in), at least 10 mm (0.39 in), at least 15 mm (0.59 in), at least 20 mm (0.79 in), at least 25 mm (0.98 in), at most 30 mm (1.18 in), at most 27 mm (1.06 in), at most 22 mm (0.87 in), at most 17 mm (0.67 in), at most 12 mm (0.47 in), and at most 7 mm (0.28 in).

B49. The panel mount system of any of paragraphs B1-B48, wherein each support structure extends along a direction that is one of:
(i) at least substantially horizontal with respect to a/the ground surface;
(ii) at least substantially vertical with respect to the ground surface; and
(iii) oblique to the ground surface.

C1. A method of assembling the panel mount system of any of paragraphs B1-B49 to form the structural surface, the method comprising:
positioning a resilient mounting clip of the panel mount system on a support structure of the panel mount system;
receiving a first panel of the panel mount system in a first panel engagement portion of the resilient mounting clip; and
receiving a second panel of the panel mount system in a second panel engagement portion of the resilient mounting clip.

C2. The method of paragraph C1, wherein the method additionally includes securing the resilient mounting clip to the support structure.

C3. The method of paragraph C2, wherein the securing the resilient mounting clip is performed prior to the receiving the first panel in the first panel engagement portion.

C4. The method of any of paragraphs C2-C3, wherein the securing the resilient mounting clip is performed subsequent to the receiving the first panel in the first panel engagement portion.

C5. The method of any of paragraphs C2-C4, wherein the securing the resilient mounting clip is performed subsequent to the receiving the second panel in the second panel engagement portion.

C6. The method of any of paragraphs C1-C5, wherein the securing the resilient mounting clip includes fastening the resilient mounting clip to the support structure with a fastener.

C7. The method of any of paragraphs C1-C6, wherein the support structure is a first support structure, wherein the resilient mounting clip is a first resilient mounting clip, and wherein at least one of:
(i) the positioning includes positioning a second resilient mounting clip along a second support structure;
(ii) a/the securing includes securing the second resilient mounting clip to the second support structure;
(iii) the receiving the first panel includes receiving the first panel in a first panel engagement portion of the first resilient mounting clip; and
(iv) the receiving the second panel includes receiving the second panel in a second panel engagement portion of the second resilient mounting clip.

C8. The method of any of paragraphs C1-C7, wherein the support structure includes an installation rail with a channel, and wherein the positioning the resilient mounting clip includes inserting each channel leg of the resilient mounting clip at least partially within the channel of the installation rail.

C9. The method of paragraph C8, when dependent from paragraph C2, wherein the securing further includes fastening the resilient mounting clip to the installation rail with the fastener.

C10. The method of any of paragraphs C1-C9, wherein the method further includes repeating at least one of the positioning the resilient mounting clip, a/the securing the resilient mounting clip, the receiving the first panel, and the receiving the second panel.

C11. The method of paragraph C10, wherein the panel mount system includes a plurality of panels that includes the first panel and the second panel, wherein the resilient mounting clip is a/the first resilient mounting clip of a plurality of resilient mounting clips, and wherein the repeating includes repeating the securing the resilient mounting clip for some, but not all, of the resilient mounting clips of the plurality of resilient mounting clips.

C12. The method of any of paragraphs C10-C11, wherein the panel mount system includes a/the plurality of panels that includes the first panel and the second panel, wherein the resilient mounting clip is a/the first resilient mounting clip of a/the plurality of resilient mounting clips, and wherein the repeating the securing the resilient mounting clip includes securing at least one resilient mounting clip of the plurality of resilient mounting clips to the support structure subsequent to each panel of the plurality of panels being operatively coupled to the support structure via at least one of the receiving the first panel and the receiving the second panel.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "comprising" may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entities in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" may mean A alone, B alone, C alone, A and B together, A and C together, B and C together, A, B, and C together, and optionally any of the above in combination with at least one other entity.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

As used herein the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It also is within the scope of the present disclosure that elements, components, and/or other recited subject matter that is recited as being adapted to perform a particular function may additionally or alternatively be described as being configured to perform that function, and vice versa.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, when the disclosure or subsequently filed claims recite "a" or "a first" element or the equivalent thereof, such disclosure and/or claims should be understood to include incorporation of one or more such elements, neither requiring nor excluding two or more such elements.

In the event that any patents, patent applications, or other references are incorporated by reference herein and (1) define a term in a manner that is inconsistent with and/or (2) are otherwise inconsistent with, either the non-incorporated portion of the present disclosure or any of the other incorporated references, the non-incorporated portion of the present disclosure shall control, and the term or incorporated disclosure therein shall only control with respect to the reference in which the term is defined and/or the incorporated disclosure was present originally.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower, or equal in scope to the original claims, also are regarded as included within the subject matter of the inventions of the present disclosure.

The invention claimed is:

1. A resilient mounting clip configured to receive a pair of panels for mounting the pair of panels relative to a support structure, the resilient mounting clip comprising:
   a support structure engagement portion configured to be selectively installed on the support structure;
   a plurality of edge extensions operatively coupled to the support structure engagement portion; and
   a plurality of outboard panel supports, each outboard panel support extending from a respective edge extension of the plurality of edge extensions and configured to at least partially retain a respective panel of the pair of panels in position with respect to the support structure;
   wherein each edge extension is configured to resiliently flex with respect to at least a portion of the support structure engagement portion responsive to respective longitudinal edges of the pair of panels moving toward and away from one another when the resilient mounting clip receives the pair of panels;
   wherein each edge extension is configured to transition between a nominal position with respect to the support structure engagement portion and at least one flexed position with respect to the support structure engagement portion, wherein the resilient mounting clip is configured to resiliently bias each edge extension toward the nominal position when each edge extension is in the at least one flexed position, wherein each edge extension is angled to extend toward a respective panel of the pair of panels when the edge extension is in the nominal position and when the resilient mounting clip receives the pair of panels, wherein each edge extension extends at least partially along a direction that is different than a direction along which at least one other edge extension extends when each edge extension is in the nominal position, and wherein each edge extension is configured to engage a respective panel of the pair of panels that is different than the panel that is engaged by the outboard panel support that extends from the edge extension when each edge extension is in the nominal position.

2. The resilient mounting clip of claim 1, wherein each edge extension of the plurality of edge extensions is oriented in a non-coplanar relation with at least one other edge extension of the plurality of edge extensions when each edge extension of the plurality of edge extensions is in the nominal position.

3. The resilient mounting clip of claim 1, wherein at least one outboard panel support of the plurality of outboard panel supports is configured to contact an exterior joint face of a respective panel of the pair of panels when the resilient mounting clip receives the pair of panels, wherein the exterior joint face faces away from the support structure when the resilient mounting clip is installed on the support structure and when the resilient mounting clip receives the pair of panels.

4. The resilient mounting clip of claim 1, wherein the support structure engagement portion at least partially defines at least one fastener aperture configured to receive a fastener to operatively couple the resilient mounting clip to the support structure.

5. The resilient mounting clip of claim 1, wherein the resilient mounting clip defines a clip plane, wherein each outboard panel support is configured to move along a direction that is at least substantially parallel to a compression axis, which is at least substantially parallel to the clip plane, when the respective edge extension resiliently flexes with respect to the support structure engagement portion.

6. The resilient mounting clip of claim 5, wherein each edge extension has a cant angle, as measured between the edge extension and a direction perpendicular to the clip plane, and wherein the cant angle of each edge extension decreases as the edge extension transitions from the nominal position toward the at least one flexed position.

7. The resilient mounting clip of claim 6, wherein the cant angle of each edge extension is at most 25 degrees when the edge extension is in the nominal position.

8. The resilient mounting clip of claim 1, wherein the support structure engagement portion includes a connecting member that operatively couples the plurality of edge extensions to one another, wherein each edge extension is configured to resiliently flex with respect to at least a portion of the connecting member.

9. The resilient mounting clip of claim 8, wherein each edge extension extends from the connecting member.

10. The resilient mounting clip of claim 8, wherein each edge extension is directly attached to the connecting member.

11. The resilient mounting clip of claim 1, wherein the support structure engagement portion includes at least one inboard panel support configured to engage a panel interior face of a respective panel of the pair of panels, wherein the panel interior face faces toward the support structure when the respective panel is operatively received by the resilient mounting clip and when the resilient mounting clip is operatively coupled to the support structure.

12. The resilient mounting clip of claim 11, wherein each edge extension extends from a corresponding inboard panel support of the at least one inboard panel support.

13. The resilient mounting clip of claim 11, wherein each edge extension is directly attached to a corresponding inboard panel support of the at least one inboard panel support.

14. The resilient mounting clip of claim 11, wherein each edge extension is configured to resiliently flex with respect to a corresponding inboard panel support of the at least one inboard panel support.

15. The resilient mounting clip of claim 11, wherein the support structure engagement portion includes a connecting member that operatively couples the plurality of edge extensions to one another, wherein each edge extension is configured to resiliently flex with respect to at least a portion of the connecting member, and wherein the connecting member includes each inboard panel support.

16. A resilient mounting clip configured to receive a pair of panels for mounting the pair of panels relative to a support structure, the resilient mounting clip comprising:
   a support structure engagement portion configured to be selectively installed on the support structure;
   a plurality of edge extensions;
   a plurality of outboard panel supports, each outboard panel support extending from a respective edge extension of the plurality of edge extensions and configured to at least partially retain a respective panel of the pair of panels in position with respect to the support structure; and
   at least one inboard panel support configured to engage a panel interior face of a respective panel of the pair of panels, wherein the panel interior face faces toward the support structure when this respective panel is operatively received by the resilient mounting clip and when the resilient mounting clip is operatively coupled to the support structure; wherein each edge extension extends from a corresponding inboard panel support of the at least one inboard panel support;
   wherein the support structure engagement portion includes a connecting member that operatively couples the plurality of edge extensions to one another, wherein each edge extension is configured to resiliently flex with respect to at least a portion of the connecting member responsive to respective longitudinal edges of the pair of panels moving toward and away from one another; and
   wherein the resilient mounting clip further comprises at least one standoff member extending from the connecting member, wherein each standoff member operatively couples the connecting member to a respective inboard panel support.

17. The resilient mounting clip of claim 16, wherein each standoff member is configured to resiliently flex with respect to the connecting member.

18. The resilient mounting clip of claim 16, wherein each standoff member extends between the connecting member and a respective edge extension of the plurality of edge extensions.

19. The resilient mounting clip of claim 16, wherein the resilient mounting clip defines a clip plane, wherein each outboard panel support is configured to move along a direction that is at least substantially parallel to a compression axis, which is at least substantially parallel to the clip plane, when the respective edge extension resiliently flexes with respect to the connecting member.

20. The resilient mounting clip of claim 19, wherein each standoff member maintains the respective inboard panel support in a spaced-apart position with respect to the connecting member such that the respective inboard panel support is spaced apart from the connecting member by a standoff distance, as measured in a direction perpendicular to the clip plane, and wherein the standoff distance is at least 10 millimeters (mm) (0.39 inches (in)) and at most 70 mm (2.76 in).

21. A panel mount system, comprising:
   at least one support structure;
   at least one resilient mounting clip operatively coupled to the support structure; and
   a pair of panels received by each resilient mounting clip;
   wherein each resilient mounting clip is the resilient mounting clip of claim 1.

22. The panel mount system of claim 21, wherein the pair of panels forms a portion of at least one of a rain screen, a curtain wall, a façade, an exterior siding, and a deck.

23. The panel mount system of claim 21, wherein each panel extends along a panel plane, wherein each panel has a pair of longitudinal edges and a pair of lateral edges, wherein each longitudinal edge is longer than each lateral edge, wherein each lateral edge extends in a direction that is parallel to a lateral axis of the panel that is at least substantially parallel to the panel plane, and wherein the lateral axis of each panel is at least substantially parallel to a ground surface when the panel is operatively received by the resilient mounting clip and when the resilient mounting clip is operatively coupled to the support structure.

24. The panel mount system of claim 21, wherein each panel is formed of a material that at least one of expands and contracts responsive to a change in at least one of an ambient humidity, an ambient moisture level, and an ambient temperature, and wherein the panel mount system is configured such that each resilient mounting clip resiliently flexes responsive to the expansion and contraction of each panel that is received by the resilient mounting clip.

25. A panel mount system, comprising:
   at least one support structure;
   at least one resilient mounting clip operatively coupled to the support structure; and
   a pair of panels received by each resilient mounting clip;
   wherein each resilient mounting clip is the resilient mounting clip of claim 16.

26. The panel mount system of claim 25, wherein the pair of panels forms a portion of at least one of a rain screen, a curtain wall, a façade, an exterior siding, and a deck.

27. The panel mount system of claim 25, wherein each panel extends along a panel plane, wherein each panel has a pair of longitudinal edges and a pair of lateral edges, wherein each longitudinal edge is longer than each lateral edge, wherein each lateral edge extends in a direction that is parallel to a lateral axis of the panel that is at least substantially parallel to the panel plane, and wherein the lateral axis of each panel is at least substantially perpendicular to a ground surface when the panel is operatively received by the resilient mounting clip and when the resilient mounting clip is operatively coupled to the support structure.

28. The panel mount system of claim 25, wherein each panel is formed of a material that at least one of expands and contracts responsive to a change in at least one of an ambient humidity, an ambient moisture level, and an ambient temperature, and wherein the panel mount system is configured such that the plurality of edge extensions of each resilient mounting clip resiliently flexes responsive to the expansion and contraction of each panel that is received by the resilient mounting clip.

29. The panel mount system of claim 25, wherein each panel has a pair of longitudinal edges and a pair of lateral edges, wherein each longitudinal edge is longer than each lateral edge, wherein each longitudinal edge of each panel includes a joint structure configured to engage at least one respective resilient mounting clip of the at least one resilient mounting clip, and wherein at least one joint structure includes a joint overhang that at least substantially conceals a respective resilient mounting clip from view when the panel is operatively received by the respective resilient mounting clip.

\* \* \* \* \*